United States Patent
Tenny et al.

(10) Patent No.: US 10,485,054 B2
(45) Date of Patent: Nov. 19, 2019

(54) SYSTEM AND METHOD FOR MANAGING NEIGHBORS IN A COMMUNICATIONS SYSTEM WITH BEAMFORMING

(71) Applicant: Futurewei Technologies, Inc., Plano, TX (US)

(72) Inventors: Nathan Edward Tenny, Poway, CA (US); Richard Stirling-Gallacher, San Diego, CA (US); Bin Liu, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 15/585,480

(22) Filed: May 3, 2017

(65) Prior Publication Data

US 2017/0347391 A1   Nov. 30, 2017

Related U.S. Application Data

(60) Provisional application No. 62/341,709, filed on May 26, 2016.

(51) Int. Cl.
*H04W 84/18* (2009.01)
*H04B 7/06* (2006.01)
(Continued)

(52) U.S. Cl.
CPC .......... *H04W 84/18* (2013.01); *H04B 7/0617* (2013.01); *H04B 7/086* (2013.01); *H04W 92/20* (2013.01)

(58) Field of Classification Search
None
See application file for complete search history.

(56) References Cited

U.S. PATENT DOCUMENTS 7,212,798 B1 *  5/2007  Adams ................. H03G 3/3068
                                                       330/278
8,155,131 B2 *  4/2012  Yan ......................... H04L 45/02
                                                       370/217
(Continued)

FOREIGN PATENT DOCUMENTS

EP      2874437 A1 *  5/2015  ............. H04W 16/28
EP      2874437 A1 *  5/2015  ............. H04W 16/28
(Continued)

OTHER PUBLICATIONS

Huawei, "Using AAS for coverage modification," 3GPP TSG-RAN WG3 Meeting #81, Agenda Item 10.2.1, R3-131531, Barcelona, Spain, Aug. 19-23, 2013, 7 pages.

(Continued)

*Primary Examiner* — Berhanu Tadese
(74) *Attorney, Agent, or Firm* — Slater Matsil, LLP

(57) ABSTRACT

A method for operating a first transmit-receive point (TRP) includes receiving a first measurement report from a user equipment (UE), the first measurement report including an identifier of a second TRP, requesting a second measurement report from the UE, the second measurement report to include automatic neighbor relation (ANR) information associated with the second TRP, wherein the ANR information includes a beam specific information, receiving the second measurement report including a first subset of the ANR information, and determining a neighbor configuration with the second TRP in accordance with the first subset of the ANR information.

20 Claims, 11 Drawing Sheets

(51) Int. Cl.
*H04B 7/08* (2006.01)
*H04W 92/20* (2009.01)

(56) References Cited

U.S. PATENT DOCUMENTS

| | | | | |
|---|---|---|---|---|
| 8,605,618 | B2* | 12/2013 | Song | H04W 48/10 370/252 |
| 9,161,373 | B2* | 10/2015 | Frenger | H04W 48/20 |
| 9,468,022 | B2* | 10/2016 | Li | H04B 7/0617 |
| 9,474,071 | B2* | 10/2016 | Dahlen | H04W 72/0453 |
| 9,538,398 | B2* | 1/2017 | Zhang | H04W 24/02 |
| 9,723,616 | B2* | 8/2017 | Cimpu | H04W 72/082 |
| 9,924,418 | B1* | 3/2018 | Cuberovic | H04W 36/0061 |
| 10,237,850 | B2* | 3/2019 | Paredes Cabrera | H04W 72/005 |
| 2011/0319110 | A1* | 12/2011 | Futaki | H04W 24/02 455/507 |
| 2012/0051274 | A1* | 3/2012 | Song | H04W 48/10 370/311 |
| 2012/0100884 | A1* | 4/2012 | Radulescu | H04W 36/0083 455/524 |
| 2012/0106370 | A1* | 5/2012 | Radulescu | H04W 36/0083 370/252 |
| 2012/0165032 | A1* | 6/2012 | Park | H04W 52/143 455/452.1 |
| 2012/0178451 | A1* | 7/2012 | Kubota | H04W 8/00 455/436 |
| 2012/0190368 | A1* | 7/2012 | Zhang | H04W 36/0055 455/436 |
| 2013/0017855 | A1* | 1/2013 | Hui | H04W 16/28 455/522 |
| 2013/0121185 | A1* | 5/2013 | Li | H04W 72/046 370/252 |
| 2013/0170385 | A1* | 7/2013 | Frenger | H04W 48/20 370/252 |
| 2013/0237218 | A1* | 9/2013 | Li | H04W 48/16 455/434 |
| 2013/0322367 | A1* | 12/2013 | Kang | H04W 48/16 370/329 |
| 2014/0004859 | A1* | 1/2014 | Drury | H04W 36/0083 455/436 |
| 2014/0119265 | A1* | 5/2014 | Shauh | H04W 4/06 370/312 |
| 2014/0141778 | A1* | 5/2014 | Zhang | H04W 24/02 455/434 |
| 2014/0162669 | A1* | 6/2014 | Dahlen | H04W 72/0453 455/450 |
| 2014/0177607 | A1* | 6/2014 | Li | H04B 7/0617 370/336 |
| 2014/0228031 | A1* | 8/2014 | Masini | H04W 36/0083 455/436 |
| 2015/0016348 | A1* | 1/2015 | Cimpu | H04W 72/082 370/329 |
| 2015/0215471 | A1* | 7/2015 | Ljung | H04M 15/58 455/405 |
| 2015/0281040 | A1* | 10/2015 | Yamine | H04W 24/02 455/436 |
| 2015/0288809 | A1* | 10/2015 | Liang | H04W 16/14 455/419 |
| 2015/0304905 | A1* | 10/2015 | Gao | H04W 36/0083 455/11.1 |
| 2015/0373572 | A1* | 12/2015 | Sahin | H04W 72/1231 370/252 |
| 2016/0029253 | A1* | 1/2016 | Sarkar | H04W 36/0016 455/436 |
| 2016/0080953 | A1* | 3/2016 | Tokgoz | H04W 24/08 455/422.1 |
| 2016/0150419 | A1* | 5/2016 | Thangarasa | H04W 4/70 370/254 |
| 2016/0234734 | A1* | 8/2016 | Chaudhuri | H04W 36/0083 |
| 2016/0295472 | A1* | 10/2016 | Huang | H04W 16/32 |
| 2016/0309332 | A1* | 10/2016 | Norrman | H04W 12/12 |
| 2017/0033904 | A1* | 2/2017 | Stirling-Gallacher | H04L 5/0048 |
| 2017/0070937 | A1* | 3/2017 | Li | H04B 7/04 |
| 2017/0105223 | A1* | 4/2017 | Zhang | H04W 16/28 |
| 2017/0127409 | A1* | 5/2017 | Mishra | H04W 24/10 |
| 2017/0201892 | A1* | 7/2017 | Wen | H04L 5/006 |
| 2017/0208494 | A1* | 7/2017 | Moon | H04W 24/10 |
| 2017/0257871 | A1* | 9/2017 | Yu | H04W 72/06 |
| 2017/0264415 | A1* | 9/2017 | Wiberg | H04B 7/0452 |
| 2017/0311217 | A1* | 10/2017 | Jung | H04W 36/04 |
| 2017/0331577 | A1* | 11/2017 | Parkvall | H04J 11/0079 |
| 2017/0331670 | A1* | 11/2017 | Parkvall | H04W 52/0274 |
| 2017/0332350 | A1* | 11/2017 | Paredes Cabrera | H04W 72/005 |
| 2017/0346525 | A1* | 11/2017 | Stirling-Gallacher | H04L 5/0005 |
| 2017/0347391 | A1* | 11/2017 | Tenny | H04W 84/18 |
| 2018/0035396 | A1* | 2/2018 | Stirling-Gallacher | H04B 7/068 |
| 2018/0048442 | A1* | 2/2018 | Sang | H04B 17/318 |

FOREIGN PATENT DOCUMENTS

| | | | | |
|---|---|---|---|---|
| EP | 3242506 A1 * | 11/2017 | | H04W 24/10 |
| GB | 2532067 A | 5/2016 | | |
| KR | 20150102730 A | 9/2015 | | |
| WO | WO 2016115710 A1 * | 7/2016 | | H04W 24/10 |
| WO | WO-2016115710 A1 * | 7/2016 | | H04W 24/10 |

OTHER PUBLICATIONS

"3GPP work items on Self-Organizing Networks," v0.1.1, RP-140048, Dec. 2013, 33 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300, V13.3.0, Mar. 2016, 295 pages.

3rd Generation Partnership Project; Technical Specification Group Radio Access Network; Evolved Universal Terrestrial Radio Access (E-UTRA); Radio Resource Control (RRC); Protocol specification (Release 13); 3GPP TS 36.331. V13.1.0, Mar. 2016, 551 pages.

Barati, et al., "Directional Cell Discovery in Millimeter Wave Cellular Networks," IEEE Transactions on Wireless Communications, vol. 14, Issue 12, Apr. 2015, 13 pages.

Capone, et al., "Context-based Cell Search in Millimeter Wave 5G Networks," https://arxiv.org/vc/arxiv/papers/1501/1501.02223v1. pdf, May 3, 2017, 5 pages.

Hou, et al., "A Novel Hybrid Beamforming Transmission Scheme for Common Channels and Signals," 2015 21st Asia-Pacific Conference on Communications (APCC), Oct. 14-16, 2015, pp. 257-261.

* cited by examiner

SYSTEM AND METHOD FOR MANAGING NEIGHBORS IN A COMMUNICATIONS SYSTEM WITH BEAMFORMING

This application claims the benefit of U.S. Provisional Application No. 62/341,709, filed on May 26, 2016, entitled "System and Method for Managing Neighbors in a Communications System with Beamforming," which application is hereby incorporated herein by reference.

TECHNICAL FIELD

The present disclosure relates generally to a system and method for digital communications, and, in particular embodiments, to a system and method for managing neighbors in a communications system with beamforming.

BACKGROUND

In the Third Generation Partnership Project (3GPP) Long Term Evolution (LTE) series of technical standards, automatic neighbor relation (ANR) is a central piece of the self-organizing network (SON) framework. ANR allows access nodes to detect neighbor cells, establish inter-communications controller interfaces dynamically, and assist in the maintenance of their own neighbor lists. The detection of a neighbor cell can be achieved by direct reception (e.g., small cells typically have a cellular receiver that can detect a covering macro cell) or assisted by user equipments (UEs) with visibility of the neighbor.

SUMMARY

Example embodiments provide a system and method for managing neighbors in a communications system with beamforming.

In accordance with an example embodiment, a method for operating a first transmit-receive point (TRP) is provided. The method includes receiving, by the first TRP, a first measurement report from a user equipment (UE), the first measurement report including an identifier of a second TRP, requesting, by the first TRP, a second measurement report from the UE, the second measurement report to include automatic neighbor relation (ANR) information associated with the second TRP, wherein the ANR information includes a beam specific information, receiving, by the first TRP, the second measurement report including a first subset of the ANR information, and determining, by the first TRP, a neighbor configuration with the second TRP in accordance with the first subset of the ANR information.

The beam specific information includes at least one of a receive beam identifier used by the UE to receive transmissions from the second TRP, a transmit beam identifier used by the second TRP, orientation information of the UE, or beamforming parameters of the second TRP. The ANR information comprises at least one of a TRP identifier of the second TRP, time division duplexed (TDD) configuration of the second TRP, ranging information, or system information. Determining the neighbor configuration includes adding, by the first TRP, a second subset of the ANR information to an entry associated with the second TRP from a neighbor list. Determining the neighbor configuration includes generating, by the first TRP, an entry associated with the second TRP for a neighbor list, the entry including a third subset of the ANR information.

Determining the neighbor configuration comprises establishing, by the first TRP, a wireless link with the second TRP. The first subset of the ANR information includes beamforming parameters of the second TRP, and determining the neighbor configuration includes imposing, by the first TRP, a bound on a search space used to search for the second TRP, and establishing, by the first TRP, the wireless link with the second TRP when the second TRP is discovered.

The method further includes delivering, by the first TRP, a fourth subset of the ANR information to a network configuration server. The method further includes receiving, by the first TRP, an instruction for managing the neighbor configuration. The instruction specifies an addition of a fifth subset of the ANR information to an entry associated with the second TRP in a neighbor list. The instruction specifies a generation of an entry associated with the second TRP in a neighbor list, the entry including a sixth subset of the ANR information. The instruction specifies an establishment of a wireless link with the second TRP.

In accordance with an example embodiment, a method for operating a UE is provided. The method includes sending, by the UE, a first measurement report to a first TRP, the first measurement report including an identifier of a second TRP determined in accordance with first signals received from the second TRP, receiving, by the UE, a request for a second measurement report, the second measurement report to include ANR information associated with the second TRP, wherein the ANR information includes a beam specific information, generating, by the UE, a subset of the ANR information in accordance with second signals received from the second TRP, and sending, by the UE, the second measurement report to the first TRP, the second measurement report including the subset of the ANR information.

The beam specific information comprises at least one of a receive beam identifier used by the UE to receive transmissions from the second TRP, a transmit beam identifier used by the second TRP, orientation information of the UE, or beamforming parameters of the second TRP. The ANR information comprises at least one of a TRP identifier of the second TRP, TDD configuration of the second TRP, ranging information, or system information. Generating the subset of the ANR information includes generating, by the UE, the subset of the ANR information in accordance with the second signals and a configuration of a receive beam used to receive the second signals. The identifier of the second TRP comprises a physical layer identifier.

In accordance with an example embodiment, a first TRP is provided. The first TRP includes one or more processors, and a computer readable storage medium storing programming for execution by the one or more processors. The programming including instructions to configure the first TRP to receive a first measurement report from a UE, the first measurement report including an identifier of a second TRP, request a second measurement report to include ANR information associated with the second TRP, wherein the ANR information includes a beam specific information, receive the second measurement report including a first subset of the ANR information, and determine a neighbor configuration with the second TRP in accordance with the first subset of the ANR information.

The programming includes instructions to configure the first TRP to one of add a second subset of the ANR information to an entry associated with the second TRP from a neighbor list, generate an entry associated with the second TRP for the neighbor list, the entry including a third subset of the ANR information, or establish a wireless link with the second TRP. The programming includes instructions to configure the first TRP to deliver a fourth subset of the ANR information to a network configuration server.

In accordance with an example embodiment, a UE is provided. The UE includes one or more processors, and a computer readable storage medium storing programming for execution by the one or more processors. The programming including instructions to configure the UE to send a first measurement report to a first TRP, the first measurement report including an identifier of a second TRP determined in accordance with first signals received from the second TRP, receive a request for a second measurement report, the second measurement report to include ANR information associated with the second TRP, wherein the ANR information includes a beam specific information, generate a subset of the ANR information in accordance with second signals received from the second TRP, and send the second measurement report to the first TRP, the second measurement report including the subset of the ANR information.

The programming includes instructions to configure the UE to generate the subset of the ANR information in accordance with the second signals and a configuration of a receive beam used to receive the second signals.

Practice of the foregoing embodiments simplifies the establishment of connections between access nodes in a beamforming environment by including beam specific information in neighbor relation information. The beam specific information assists in the determination of communications beams used by the access nodes, helping to make more efficient the search for neighbor access nodes.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
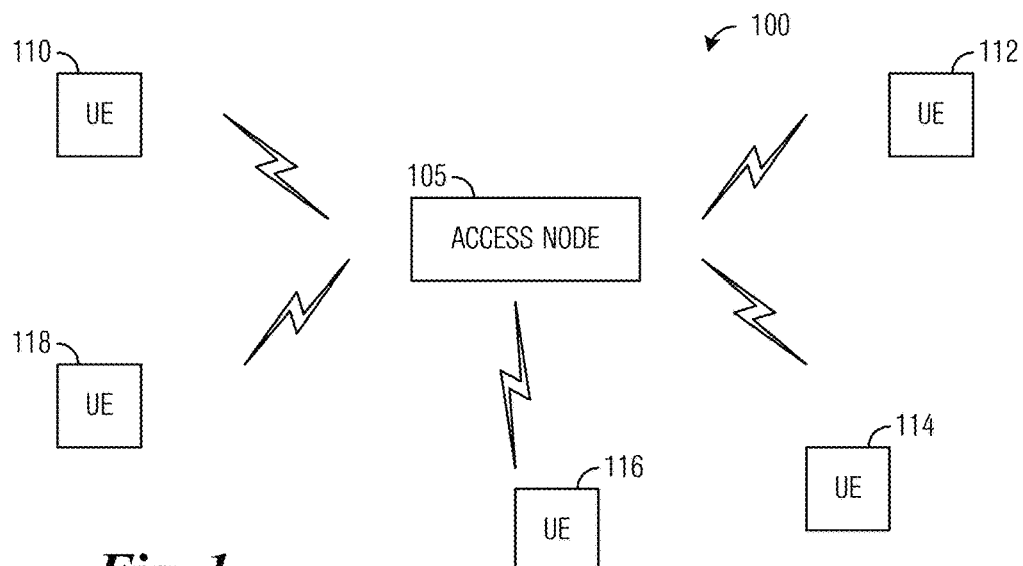
FIG. 1 illustrates an example communications system.

FIG. 1 illustrates an example communications system 100. Communications system 100 includes an access node 105 serving a plurality of UEs, such as UE 110, UE 112, UE 114, UE 116, and UE 118. In a first operating mode, communications originating at a UE or destined for a UE go through and utilize network resources allocated by access node 105. In a second operating mode, UEs can directly communicate with one another without having to go through access node 105. The network resources used by the communicating UEs may be allocated by access node 105. Access nodes may also be referred to as NodeBs, evolved NodeBs (eNBs), master eNBs (MeNBs), secondary eNBs (SeNBs), Next Generation (NG) Node Bs (gNBs), master gNBs (MgNBs), secondary gNBs (SgNBs), base stations, access points, access controllers, mobility anchors, and so on. UEs may also be referred to as terminals, stations, users, subscribers, mobiles, mobile stations, and so on.

While it is understood that communications systems may employ multiple access nodes capable of communicating with a number of UEs, only one access node, and five UEs are illustrated for simplicity. Furthermore, communications systems may include additional network entities that control the operation of the communications systems, including gateways, authentication entities, authorization entities, mobility support entities, communications support entities, and so on. These network entities and others are not shown in FIG. 1.

A transmission point (TP) may be considered to be a device sending a transmission, and a reception point (RP) may be considered to be a device receiving a transmission. A single device may be both a transmission point and a reception point for different transmissions; such a device is referred to as a transmit-receive point (TRP). Access nodes may be TRPs. In some situations, UEs may also be TRPs.

In a communications system using beamforming, communicating devices (such as access nodes, UEs, relays, remote antennas, and so on) use antenna arrays configured with antenna coefficients to shape beam patterns of the antenna arrays to enable directional transmission and/or reception. By concentrating the energy in specific directions, transmission performance may be improved by increasing transmission power in the specific directions and increasing transmission range or reducing interference to devices that are not lying along the specific directions. Similarly, reception performance may be improved by increasing reception gain in the specific directions and increasing the received signal strength of received transmissions or reducing noise from devices that are not lying along the specific directions.

Although beamforming provides significant performance advantages, the detection of neighbor cells in a communications system using beamforming may become challenging because a neighbor cell may not be transmitting in the correct direction (i.e., the neighbor cell may not be transmitting using a transmission beam that is directed towards the access node) and/or at the correct time (i.e., at the current time, the neighbor cell is transmitting using a transmission beam directed towards the access node, but the access node does not have a receive beam directed towards the neighbor cell) to be detected by the access node. Furthermore, if a UE reports a neighbor cell, it is not entirely obvious to the access node which direction the access node should look in order to find the neighbor cell and establish a connecting interface. Thus, the access node may have no choice but to perform an exhaustive search, receiving in all possible directions for relatively long periods of time, until it detects the neighbor cell. While these types of problems exist in any communications system that depends upon beamforming, they are especially problematic in communications systems operating at high frequencies, e.g., millimeter wavelengths (mm Wave communications systems), due to the high path loss at these high frequencies.

It is noted however that the discovery of a neighboring cell is generally a one-time process, meaning that search time is not as critical as it would be if the discovery process occurred frequently. However, a backhaul may compete with an access link for network resources (e.g., transceivers, antenna elements, and so on), so there is a benefit in reducing the time for which the network resources need to be used for the discovery of neighbor cells. Further, in a dynamic network environment where new neighbor cells may be discovered frequently and the search process repeated for each such new neighbor cell, the accumulated impact of the search time associated with multiple searches could be significant to the performance of the system.

Figure 2:
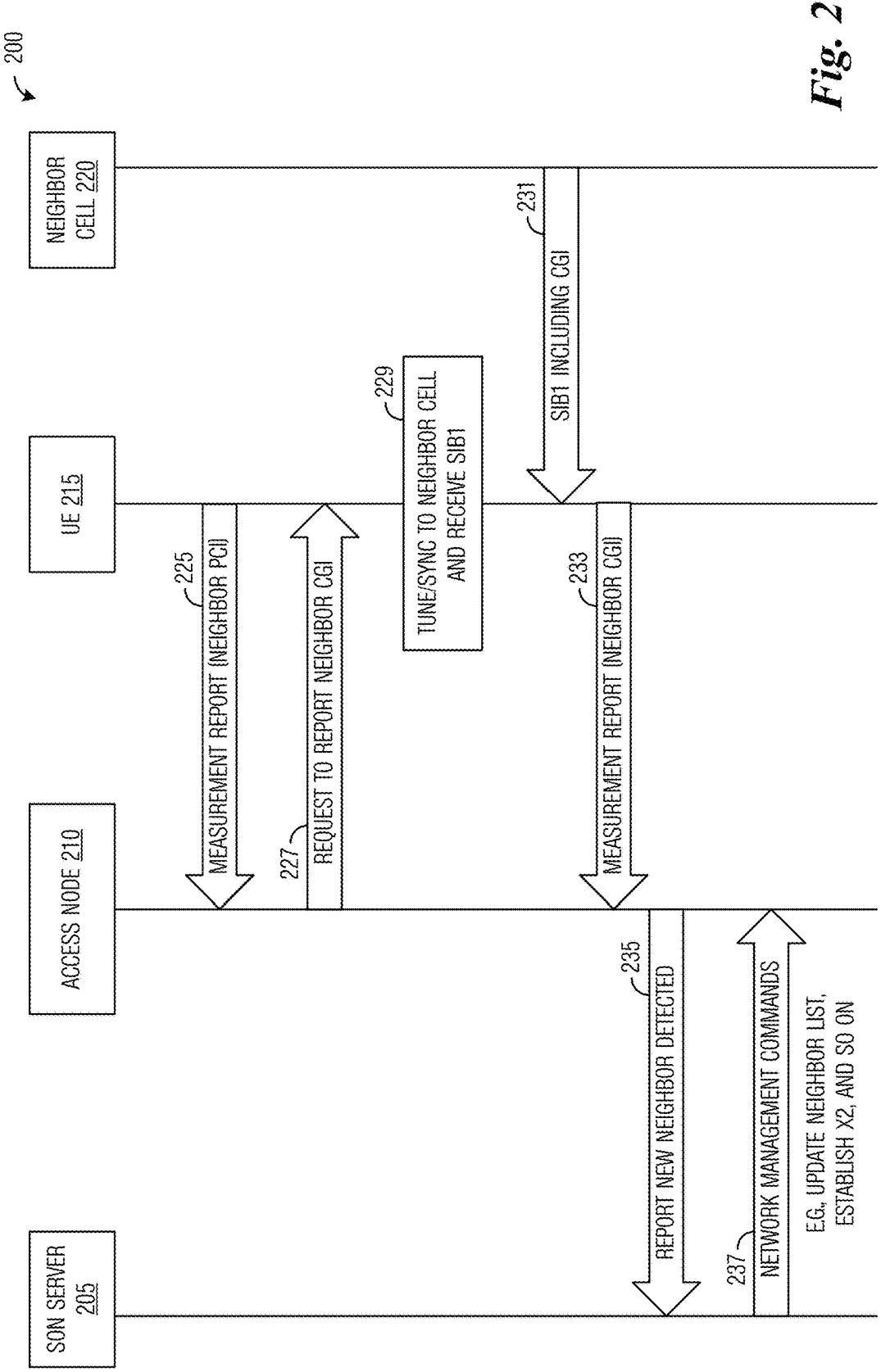
FIG. 2 illustrates an example ANR procedure utilizing 3GPP LTE terminology.

FIG. 2 illustrates an example automatic neighbor relation (ANR) procedure 200 utilizing 3GPP LTE terminology. An ANR procedure allows an access node to discover neighbor cells. In general, if the access node sees new physical cell identities (PCIs) in a measurement report from a UE, for example, the access node may direct the UE to report the global cell identifiers (CGIs) associated with the PCIs. The information provided by the UE may be used for maintaining neighbor relations, e.g., updating the neighbor list, establishing an X2 interface, etc. The ANR procedure is considered part of the self-organizing network (SON) framework, embodied in a neighbor relation management function of the access node. Control is usually located in a network configuration server, such as a SON server, but other approaches, such as distributed management, are possible. FIG. 2 illustrates interactions (e.g., messages exchanged, processing performed, and the like) between a SON server 205, an access node 210, a UE 215, and a neighbor cell 220.

ANR procedure 200 begins with UE 215 sending a measurement report to access node 210 (event 225). The measurement report includes signal strength reports, such as reference signal received power (RSRP), reference signal received quality (RSRQ), received signal strength indicator (RSSI), and so on, for cells detectable by UE 215. In addition to the signal strength reports, the measurement report also includes PCIs for the cells that are detectable by UE 215. Access node 210 requests UE 215 to report the CGI of neighbor cell 220, identified by its PCI, based on its inclusion among the PCIs of the cells that are detectable by UE 215 (event 227). In a situation where UE 215 reported multiple PCIs, access node 210 may send multiple requests UE 215, with one request per PCI, for example. UE 215 tunes to the frequency of neighbor cell 220, if necessary, and synchronizes with neighbor cell 220 to receive a system information block (SIB) transmitted by neighbor cell 220 (block 229). Neighbor cell 220 sends a SIB1 (a first SIB) that includes the CGI (event 231). UE 215 sends another measurement report to access node 210, the measurement report includes the CGI of neighbor cell 220 (event 233). Access node 210 reports to SON server 205 that a new neighbor cell has been detected (event 235) and SON server 205 sends one or more network management commands (event 237). The one or more network management commands may include: update neighbor list, establish an X2 connection with neighbor cell 220, and so on.

In 3GPP LTE, establishing an X2 interface assumes that there is transport between the access nodes. The transport may be wired, microwave, and so on. However, in a beamformed environment, establishing the transport may require more effort than in an environment of pre-existing point-to-point links. A dynamic wireless backhaul environment (i.e., the wireless links between network nodes are not pre-established, as a dedicated microwave link between network nodes might be) requires a procedure for establishing a new connection. Additionally, communication with beamforming requires the communications beams (i.e., transmit beams and/or receive beams) to be oriented in the right directions at the right times. Characterizing a neighbor cell (e.g., conveying a configuration for a cell in the neighbor list, or indicating properties of the cell to expedite discovery of the cell by another access node) that uses transmit beamforming requires additional attention. As an example, a simple description of "neighbor cell with PCI X, and cell offset Y" may be insufficient to allow an access node to locate the neighbor cell in a communications system with beamforming. Additional parameters related to the beamforming configuration may be needed. For example, a beamforming codebook that allows for the translation of a transmit beam identifier to physical coverage may be used. As an additional example, if time multiplexing of uplink and downlink beams is used in conjunction with beamforming, a duplexing pattern is also needed. These considerations, along with others, affect the establishment of an X2 connection and managing neighbor lists in beamformed environments. Therefore, in a situation where all cells are obligated to use beamforming, such as in a mm Wave communications system, neighbor relation management needs to account for the considerations.

The LTE ANR procedure in a beamforming environment is expressible in a high-level pseudocode as:

1. UE reports a new PCI of neighbor cell to serving communications controller;
2. Serving communications controller instructs UE to determine CGI of the neighbor cell;
3. UE monitors the neighbor cell to determine CGI—
   a. the monitoring occurs as specified by the serving communications controller (e.g., measurement gaps, or similar), and b. the monitoring occurs without the UE knowing in advance the configuration of the transmit beams of the neighbor cell;

4. UE reports CGI to serving communications controller—
   a. the serving communications controller may update the neighbor list (directly or through a SON server), and
   b. however, the neighbor list lacks beamforming and/or directional information related to the neighbor cell;

5. Serving communications controller searches for the neighbor cell—
   a. the search occurs in all directions,
   b. the search includes a long dwell time in each direction,
   c. the search uses sufficiently narrow receive beams to be confident of detecting the neighbor cell (thus requiring a correspondingly high number of search operations to cover "all directions"), and
   d. the search is performed without prior information about where and/or when to search; and 6. Serving communications controller establishes communications with the neighbor cell, e.g., to set up an X2 connection.

The search for the neighbor cell by the serving communications controller may be optimized, but the efficiency of the search impacts the speed at which the X2 connection is established. It may be possible to reduce the impact of the ANR procedure on the access link by obtaining information about the where and/or when to perform the search. Efficiency of the search may be more important in ultra-dense network (UDN) scenarios, where frequent neighbor changes are more likely, or in dynamically changing network environments.

The lack of beamforming and/or directional information in the neighbor list may be a significant problem because UE performance may be negatively impacted in a continuous way. In the current 3GPP LTE standards, the neighbor list indicates that a particular cell is a neighbor cell without providing any information about beams and/or directions. The lack of information about beams and/or directions presents a problem each time the neighbor list is accessed and information about the neighbor cells is used, for communications system management, configuring connections, address assignment, connection handoffs, and so on, for example. In general, the lack of information results in the communicating devices not knowing where and/or when to communicate or measure in a beamformed environment.

Figure 3:
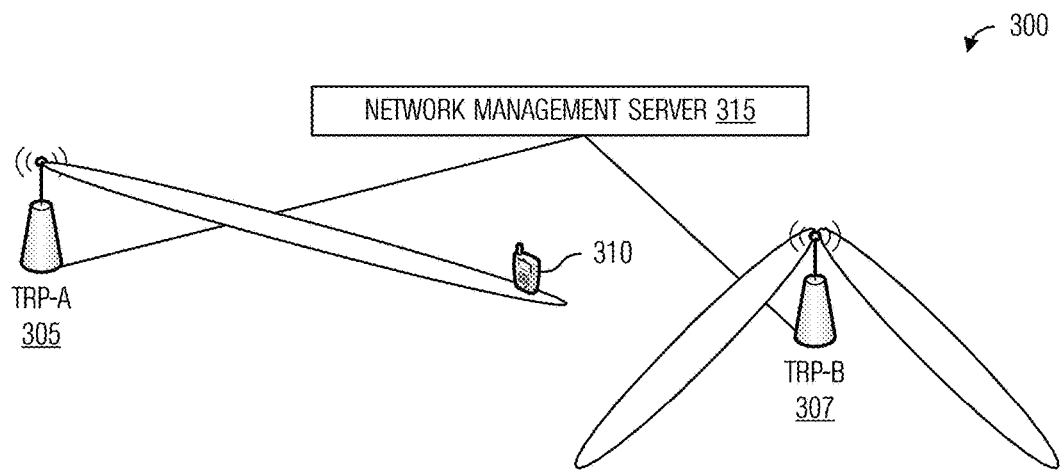
FIG. 3 illustrates a communications system supporting beamforming.

FIG. 3 illustrates a communications system 300 supporting beamforming. Communications system 300 includes a first TRP ("TRP-A") 305 and a second TRP ("TRP-B") 307. Both first TRP 305 and second TRP 307 use beamforming on access links and are physically close together but are not yet aware of each other's existence. Communications system 300 may be a high frequency (HF) communications system, such as an mm Wave communications system. First TRP 305 and second TRP 307 are connected via a backhaul (wired or otherwise, already established) to a network management server 315. An example of a network management server is a SON server. Network management server 315 may not know if first TRP 305 and second TRP 307 are within range in order to be able to communicate over the air. It noted that network management server 315 may know geographical information regarding first TRP 305 and second TRP 307 so network management server 315 may be able to make an informed estimate regarding the ability of first TRP 305 and second TRP 307 to communicate with one another.

As shown in FIG. 3, first TRP 305 is serving UE 310. UE 310 is not connected to second TRP 307, but UE 310 may be able to detect transmissions of second TRP 307. As an example, UE 310 may be able to make measurements of reference signals transmitted by second TRP 307. Thus, UE 310 may be able to assist TRP 305 in detecting that second TRP 307 is nearby.

When or if first TRP 305 detects second TRP 307, first TRP 305 reports second TRP 307 to network management server 315, for the purpose of neighbor list management, for example. First TRP 305 may start communications with second TRP 307 directly, to establish an interface (e.g., X2) between first TRP 305 and second TRP 307, for instance. The interface may be in-band with the access link or out of band. In a situation where the interface is out of band with respect to the access link, the interface may utilize beamforming, but on a different frequency.

In order to receive a signal from second TRP 307, first TRP 305 must point a receive beam towards second TRP 307. In general, narrower beams require more precise beam pointing. Blind searching is the easiest way to search for second TRP 307. In blind searching, first TRP 305 sweeps through all receive beams to listen for transmissions (e.g., broadcast transmissions) from any possible neighboring TRPs. Co-assigned application entitled "System and Method for Time Division Duplexed Multiplexing in Transmission Point to Transmission Point Connectivity,", which is hereby incorporated herein by reference presents example blind searching techniques.

Communications beams used in broadcasting generally are wider than the communications beams used in unicast beamforming. Alternatively, narrow communications beams that generally have higher gain but smaller coverage may be used in conjunction with transmit diversity, i.e., cyclic delay diversity (CDD). The wider communications beams usually offer shorter range, e.g., if the unicast beams support extended coverage, but with greater coverage. However, conservative modulation and coding scheme (MCS) used on the broadcast beams help to mitigate the lower beamforming gain. Additional gain may be achieved using signal repetition, however longer reception time is needed.

First TRP 305 may need to tradeoff when selecting parameters for the communications (receive) beams used in the blind searching: higher gain results in better range, but requires a narrower receive beam and longer time to sweep through all directions because more receive beams are used to provide sufficient coverage. The increase in sweep time may be problematic if radio resources used in the blind searching makes them unavailable for the access link. In other words, the increased sweep time consumes resources that may otherwise be used for the access link. Therefore, minimizing the sweep time is useful in avoiding the need to take capacity away from the access link. The portion of the sweep time spent receiving from a particular beam direction may be referred to as the dwell time for that receive beam.

Longer dwell time for each receive beam increases the probability of finding a neighbor cell, due to the increased opportunities for the dwell time to overlap with a transmission from the neighbor cell, and also potentially via accumulating more energy by combining multiple repetitions of such a transmission. In the case where neighbor cells switch between directions for the transmit beams even in broadcast mode, reducing the number of receive beam directions, while maintaining the same total search time, allows for greater dwell times in each receive beam direction.

Figure 4:
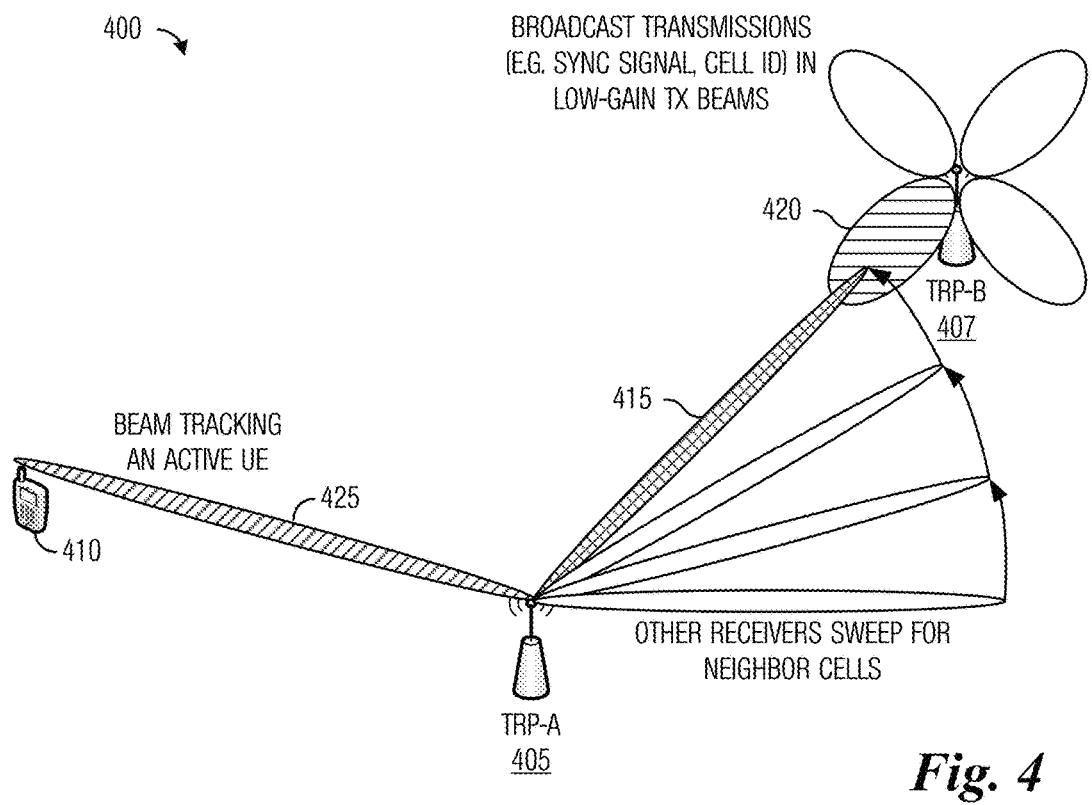
FIG. 4 illustrates a communications system performing a blind searching procedure.

FIG. 4 illustrates a communications system 400 performing a blind searching procedure. A first TRP 405 is sweeping through receive beams to detect transmissions made by a second TRP 407. As shown in FIG. 4, with beam 415, first TRP 405 is directly pointed at second TRP 407 and is able detect a transmission made by second TRP 407 using beam 420. First TRP is also tracking a UE 410 with beam 425.

Figure 5A:
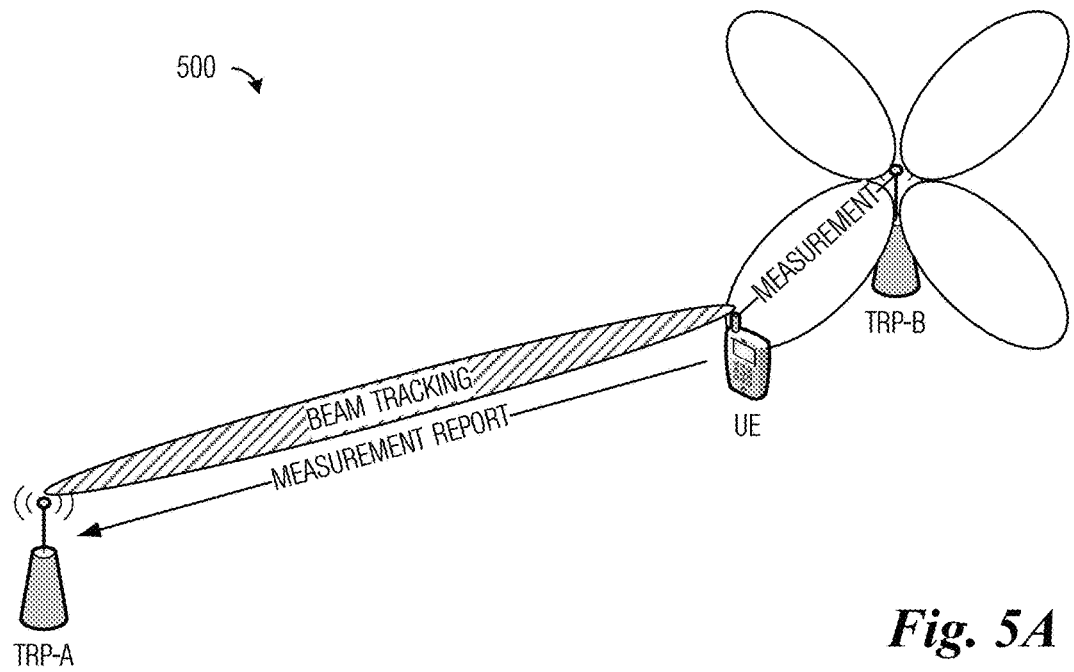
FIG. 5A illustrates a communications system wherein a guess that the second TRP is near the UE results in a good guess according to embodiments presented herein.
Figure 5B:
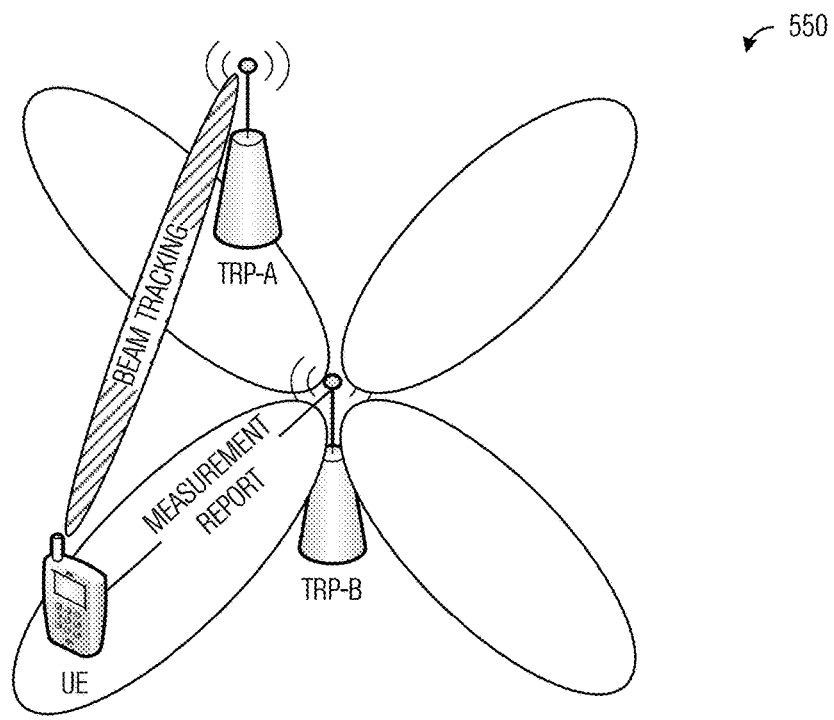
FIG. 5B illustrates a communications system wherein a guess that the second TRP is near the UE results in a poor guess according to embodiments presented herein.

According to an example embodiment, in order to improve neighbor search efficiency, a TRP uses a UE with which it is in communications to detect the presence of neighboring TRPs. If a UE that is being served by a first TRP is able to detect a second TRP, the UE may send a measurement report containing measurements of the second TRP, which can trigger a neighbor detection procedure at the first TRP. However, a typical cellular measurement report, as used today in ANR, does not contain sufficient information for the first TRP to accurately point a receive beam at the second TRP. Availability of the information in an enhanced measurement report can reduce the search space associated with each neighboring TRP, even when the information is an approximation, a reduction in angular coverage is achievable. It is noted that in 3GPP LTE, there is a special measurement type for reporting the global cell ID of a neighbor cell. The use of the measurement report results in the first TRP knowing that the second TRP is somewhere near (at least within communication range of the UE), but the first TRP still has to guess about the direction of the second TRP. As an illustrative example, a good guess would be that the second TRP is near the UE. However, the quality of the guess is very geometry dependent. FIG. 5A illustrates a communications system 500 wherein a guess that the second TRP is near the UE results in a good guess, i.e., a reasonably accurate estimate of the direction from the first TRP to the second TRP. FIG. 5B illustrates a communications system 550 wherein a guess that the second TRP is near the UE results in a poor guess. The quality of the guess in these examples can have an associated error ranging from approximately 5 to 30 degrees, depending on scenario.

According to an example embodiment, optimization of the search for neighbor TRPs at a serving TRP is possible in both time and angle dimensions using information provided by the UE. As an example, knowing an approximate direction of a neighbor TRP reduces the angular search space because the serving TRP uses only receive beams that span the approximate direction of the neighbor TRP. As another example, knowing the transmit beam direction and timing of a neighbor TRP (i.e., the configuration of the beamforming broadcast transmissions of the neighbor TRP) reduces the temporal search space because the serving TRP only attempts to detect the neighbor TRP when the neighbor TRP is broadcasting in the direction of the serving TRP. The UE may be able to provide either or both types of information (approximate direction, and transmit beam direction and timing) to the serving TRP depending on network configuration, UE location, timing of measurements, and so on.

It is noted that the amount of benefit afforded by the information provided by the UE may vary depending upon the network. Generally, neighbor detection and interface establishment occurs only once per pair of TRPs. Even if a TRP switches off for a time, the TRP probably will not move before switching back on. Normally, networks are fairly static. However, exceptions exist, such as in a highly dynamic ad-hoc deployment. Therefore, the benefits associated with optimizing the search for neighbor TRPs are most significant when neighbor TRPs come and go frequently and unpredictably (such as in a UDN, or ad-hoc type deployments), or when the access links are heavily loaded and opportunities for searching for neighbor TRPs are limited.

In general, the further away the UE is from the serving TRP, the better the UE provided directional information about the neighbor TRP. In other words, the further away the UE is from the serving TRP, the more closely the direction of the UE with respect to the serving TRP approximates the direction of the neighbor TRP with respect to the serving TRP. Additionally, the UE knows the direction in which it is receiving transmissions from the neighbor TRP, with the accuracy of the direction being dependent upon the beam width of the receive beams used by the UE. This directional estimate between the UE and the neighbor TRP may be used to help refine a directional estimate between the serving TRP and the neighbor TRP.

According to an example embodiment, ranging information about the UE and/or directional information between the UE and the neighbor TRP is provided to the serving TRP to assist the serving TRP search for the neighbor TRP. According to another example embodiment, the configuration of the neighbor TRP, e.g., beamforming parameters of the neighbor TRP, are also provided to the serving TRP. The configuration of the neighbor TRP may be obtained by the UE by decoding a broadcast channel (BCCH) of the neighbor TRP. According to another example embodiment, a global cell identifier or a TRP identifier report is also provided to the serving TRP, thereby allowing the serving TRP to retrieve useful information about the neighbor TRP from a network entity, such as a SON server.

Ranging between the serving TRP and the UE may be performed in a variety of ways. In a line of sight (LoS) scenario, there are many ways to perform ranging between the serving TRP and the UE. However, in a non-LoS (NLoS) scenario, ranging can be difficult with a possible exception involving UE geolocation information. As an example, the serving TRP may apply heuristics, such as jumps in channel quality indicators (CQI), to determine which UEs are likely to be in LoS or NLoS. Two exemplary quantities that can be measured easily, and used to estimate range in LoS situations, are the propagation time and the pathloss of a signal between the UE and the serving TRP. Because of the variation in RF conditions that can affect signal propagation, timing is usually a better measure of range than pathloss. But at short ranges, such as those in HF (e.g., mm Wave) communications systems, timing measurements may not be very useful. In general, high frequencies allow fine-resolution timing measurements, but in consideration of small mm Wave cell sizes, even a small timing measurement error may be much more significant. Both pieces of information (timing information and pathloss) can be made available to the serving TRP via UE measurements. Alternatively, if the serving TRP can obtain the position of the UE, the serving TRP can directly determine the range.

Directional information of the neighbor TRP from the UE may be obtained. Due to the use of beamforming, the UE automatically knows a direction of the receive beam it used to detect the neighbor TRP. The definition and accuracy of the direction of the receive beam may vary depending on beamforming assumptions. As an example, an identifier of the receive beam used by the UE corresponds to a physical direction. Other receive beam beamforming parameters may be provided, such as the gain of the receive beam at the time the neighbor TRP was detected, as well as static capabilities of the UE (including a number of antenna elements) that should already be known to the serving TRP, during the signaling of the directional information to the serving TRP. The directional information of the neighbor TRP from the UE results in an approximate vector connecting the UE and the neighbor TRP. Uncertainty present in the directional information may be due to the beam width of the receive beam of the UE (which may be as large as $\pm\pi/4$ radians, for example). Averaging the directional information over time helps to reduce the uncertainty. As an example, the UE may filter the directional information or make multiple separate measurements over time. However, the directional information provided by the UE is specified relative to the orientation of the UE, which is not necessarily known to the serving TRP. The serving and neighbor TRPs may also be in unknown or partially unknown orientations. The directional information is also in the form of a vector from the UE towards the neighbor TRP, and not from the serving TRP towards the neighbor TRP. As a consequence, there may be a need for additional processing of the directional information to compensate for the effect of the UE's orientation and the orientations of the respective TRPs, and to transform the directional vector based at the UE to one based at the serving TRP.

According to an example embodiment, the UE is able to determine information about the transmit beamforming used by the neighbor TRP through processing of the downlink signals transmitted by the neighbor TRP. An identifier of the transmit beam transmitted by the neighbor TRP may be signaled on the transmit beam, for example, the identifier may be transmitted in synchronization signals, system information, reference signals, and so on. The identifier of the transmit beam may assist the UE in determining the direction of the neighbor TRP with respect to the UE. As an illustrative example, in a situation where codebook beamforming is used, the devices (i.e., the UE and the neighbor TRP) have information about the communications beams being used (in the form of a codebook of communications beams, for example), therefore an identifier of the transmit beam would permit the UE to reference the codebook and determine the direction of the transmit beam. However, the identifier of the transmit beam may not map to a direction, such as when non-codebook beamforming is used. Additionally, the identifier of the transmit beam may not be applicable to the transmission of reference signals. However, if other signals are also being transmitted, the identifier of the transmit beam may be utilized. More beamforming parameters may be needed, such as a steering matrix, when other signals are being transmitted. If the additional beamforming parameters are present in system information, the UE can detect and report them. If the additional beamforming parameters are not available in the system information, an active reporting approach may be used. An example active reporting approach is described below.

According to an example embodiment, the serving TRP uses directional information from possibly more than one UE to optimize the search for the neighbor TRP. The serving TRP can reduce the search space by pointing receive beams in the expected direction of the neighbor TRP, based on the collective information from multiple UEs (e.g., an intersection of regions in which each UE indicates the neighbor TRP can be found). The timing information (such as a duplexing pattern used by the neighbor TRP) for the neighbor TRP can further optimize the search for the neighbor TRP if the neighbor TRP time multiplexes transmissions.

The orientation of the neighbor TRP may not be readily determined by the UE or the serving TRP. One solution may be to consider the orientation of the neighbor TRP fixed. As an example, all TRPs are considered to be self-configuring so that their beam patterns are aligned on a simple principle, such as beam O is always oriented due north, for example. An alternative solution may be to have the orientation of the neighbor TRP known by a database, such as at a SON server, for example, and the orientation reported to the serving TRP upon request. As yet another alternative solution, the neighbor TRP may indicate the orientation in system information. As an example, the neighbor TRP indicates an offset from true north field or even a full 3-dimensional rotation matrix in the system information, and the UE reports the indication to the serving TRP.

According to an example embodiment, the serving TRP determines the orientation of the neighbor TRP in several ways: through hardcoded orientation configuration, retrieve the orientation from a database, or receive the orientation in a report from the UE.

The spatial orientation of the UE is correctable in LoS or near LoS scenarios. If the orientation is known by the UE through internal sensors, the UE is able to report the spatial orientation to the serving TRP. However, not all UEs have the sensors required to determine the spatial orientation.

Figure 6:
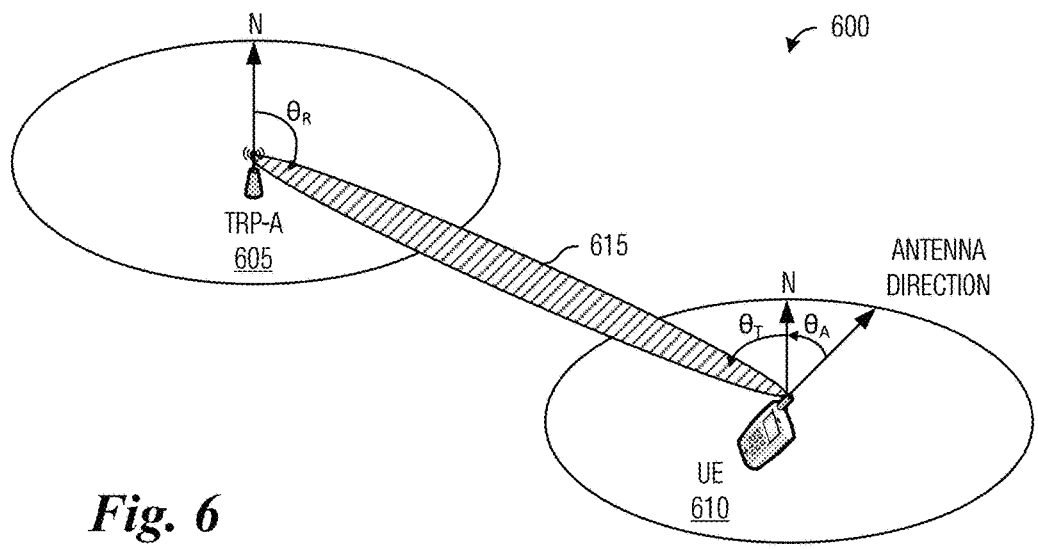
FIG. 6 illustrates a communications system highlighting the determination of the spatial orientation of a UE by a serving TRP according to embodiments presented herein.

FIG. 6 illustrates a communications system 600 highlighting the determination of the spatial orientation of a UE 610 by a serving TRP 605. As shown in FIG. 6, UE 610 is connected wirelessly to serving TRP 605 by a narrow beam 615. It is noted that the illustration shown in FIG. 6 is a 2-dimensional figure. However, the determination of the spatial orientation in three dimensions is similar.

Serving TRP 605 determines $\theta_A$, the angle off a reference direction, e.g., true north, for UE 610. The angle $\theta_A$ may be applied to the angle reported by UE 610 as the angle of the vector from UE 605 to the neighbor TRP. Serving TRP 605 is receiving at a known angle $\theta_R$ from the reference direction. UE 610 is transmitting at an angle $\theta_T+\theta_A$ relative to its own orientation. Clearly, $\theta_R+\theta_T=\pi$ radians. Therefore, if serving TRP 605 knows $\theta_T+\theta_A$, serving TRP 605 has enough information to determine $\theta_A$. Hence, if UE 610 reports its own transmit beamforming parameters, which will provide $\theta_T+\theta_A$, serving TRP 605 can correct for the orientation of UE 610. It is noted that $\theta_T$ has significant uncertainty for a typical UE using wide beam width beams, which is the same issue as the measured direction between the UE and the neighbor TRP discussed previously. However, multiple measurements can help to reduce uncertainty. But, even an approximation is useful in helping the serving TRP.

Figure 7:
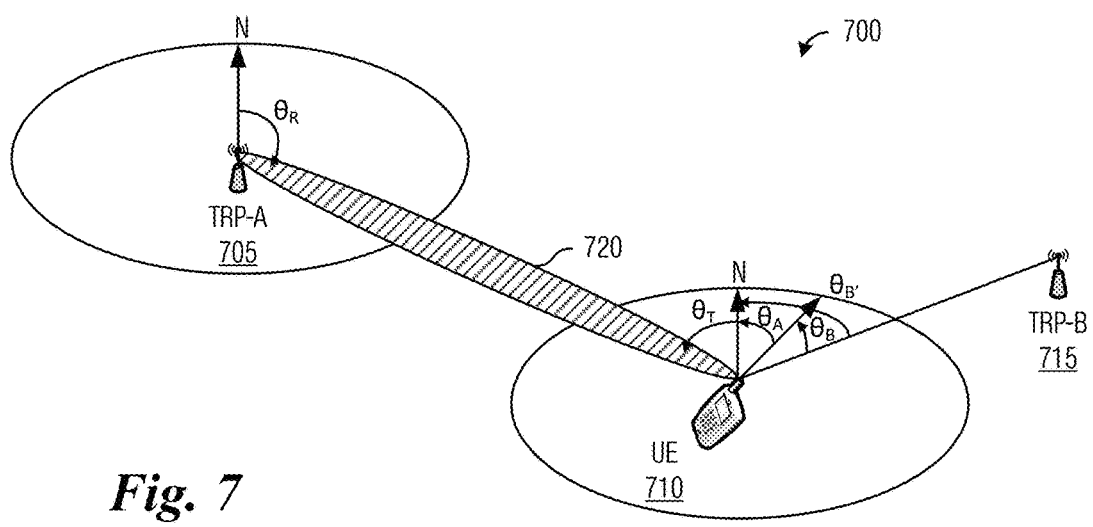
FIG. 7 illustrates a communications system highlighting the determination of the spatial orientation of a neighbor TRP by a serving TRP according to embodiments presented herein.

FIG. 7 illustrates a communications system 700 highlighting the determination of the spatial orientation of a neighbor TRP 715 by a serving TRP 705. As shown in FIG. 7, UE 710 is connected wirelessly to serving TRP 705 by a narrow beam 720. It is noted that the illustration shown in FIG. 7 is a 2-dimensional figure. However, the determination of the spatial orientation of neighbor TRP 715 in three dimensions is similar.

Serving TRP 705 knows the angle $\theta_R$, which is the angle of narrow beam 720. The angle $\theta_R$ is relative to the reference direction and is based on beamforming settings of serving TRP 705. Serving TRP 705 also knows the angle $\theta_T$ by triangle geometry. Serving TRP 705 receives a report from UE 710, which includes the angle $\theta_B$ that is the angle of receive beam used by UE 710 to receive transmissions from neighbor TRP 715. The angle $\theta_B$ is relative to the orientation of UE 710. The accuracy of the angle $\theta_B$ is limited by the beam width of the receive beam of UE 710. The report from UE 710 also includes the angle $\theta T+\theta_A$ that is the angle of a transmit beam used to transmit to serving UE 705. The accuracy of the angle $\theta T+\theta_A$ is limited by the beam width of the transmit beam of UE 710. Serving TRP 705 determines $\theta_A$ and $\theta_{B'}=\theta_B+\theta_A$, which is the angle of the receive beam used by UE 710 to receive transmissions from neighbor TRP 715. The angle $\theta_{B'}$ is relative to the reference direction.

Figure 8:
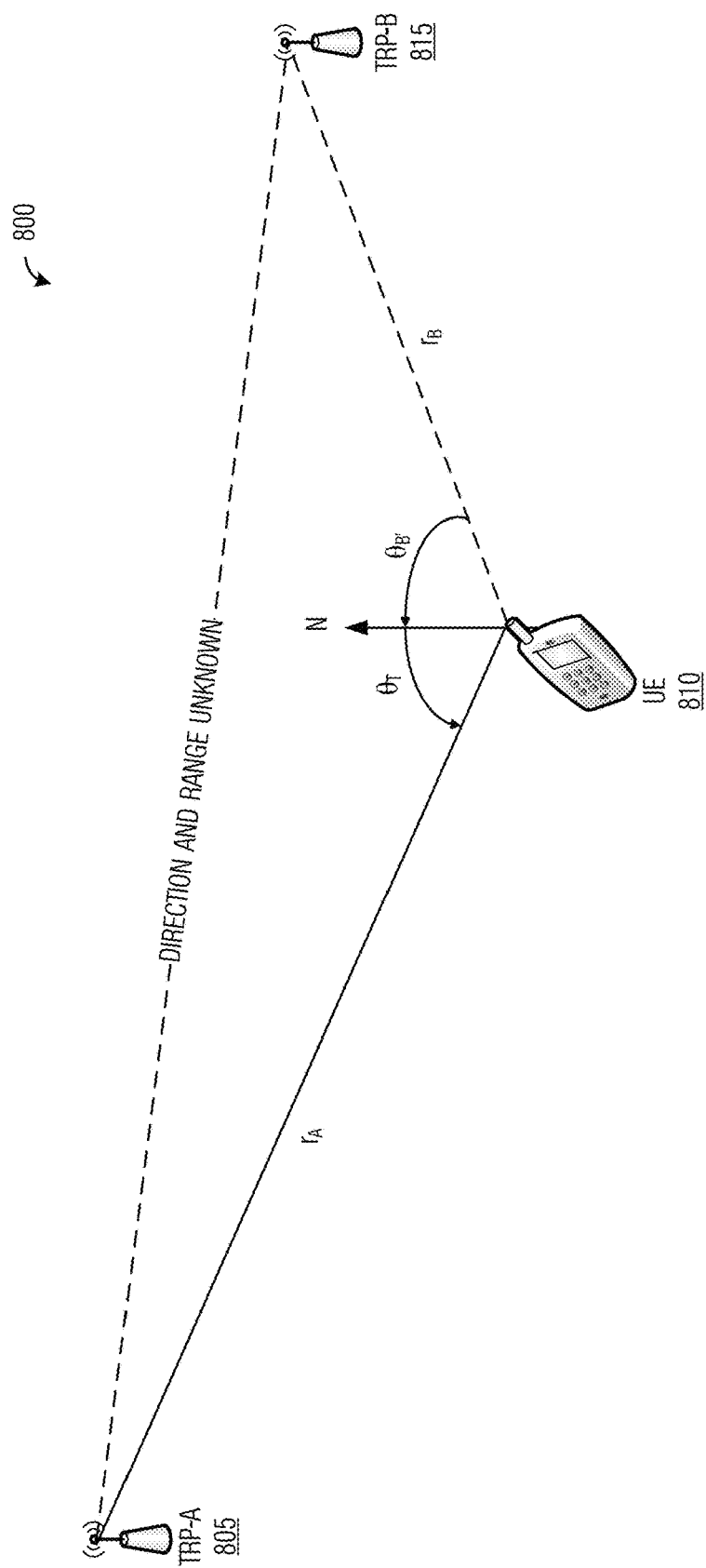
FIG. 8 illustrates a communications system highlighting how directional information assists a serving TRP search for a neighbor TRP according to embodiments presented herein.

FIG. 8 illustrates a communications system 800 highlighting how directional information assists a serving TRP 805 search for a neighbor TRP 815. As discussed previously, serving TRP 805 is able to determine approximations of angles $\theta_B$, and $\theta_T$, and range $r_A$ to a UE 810. Knowledge of $\theta_{B'}$, $\theta_T$, and $r_A$ provides serving TRP 805 guidance regarding the search for neighbor TRP 810. Even if the approximation error is large, the reduction in the search space may also be large, especially in situations when $r_A$ is large. If range $r_B$ from UE 810 to neighbor TRP 815 is bounded or estimated (using pathloss, for example), the accuracy of the approximations is much better. Estimating $r_B$ may be difficult. A technique that serving TRP 805 may use includes starting the search for neighbor TRP 815 at the direction derived from the directional information and search outward in all directions. The amount outward from the direction derived from the directional information may be set in accordance with confidence in the directional information, i.e., the less confidence there is in the directional information, the further away from the direction derived from the directional information serving TRP 805 will search.

Figure 9:
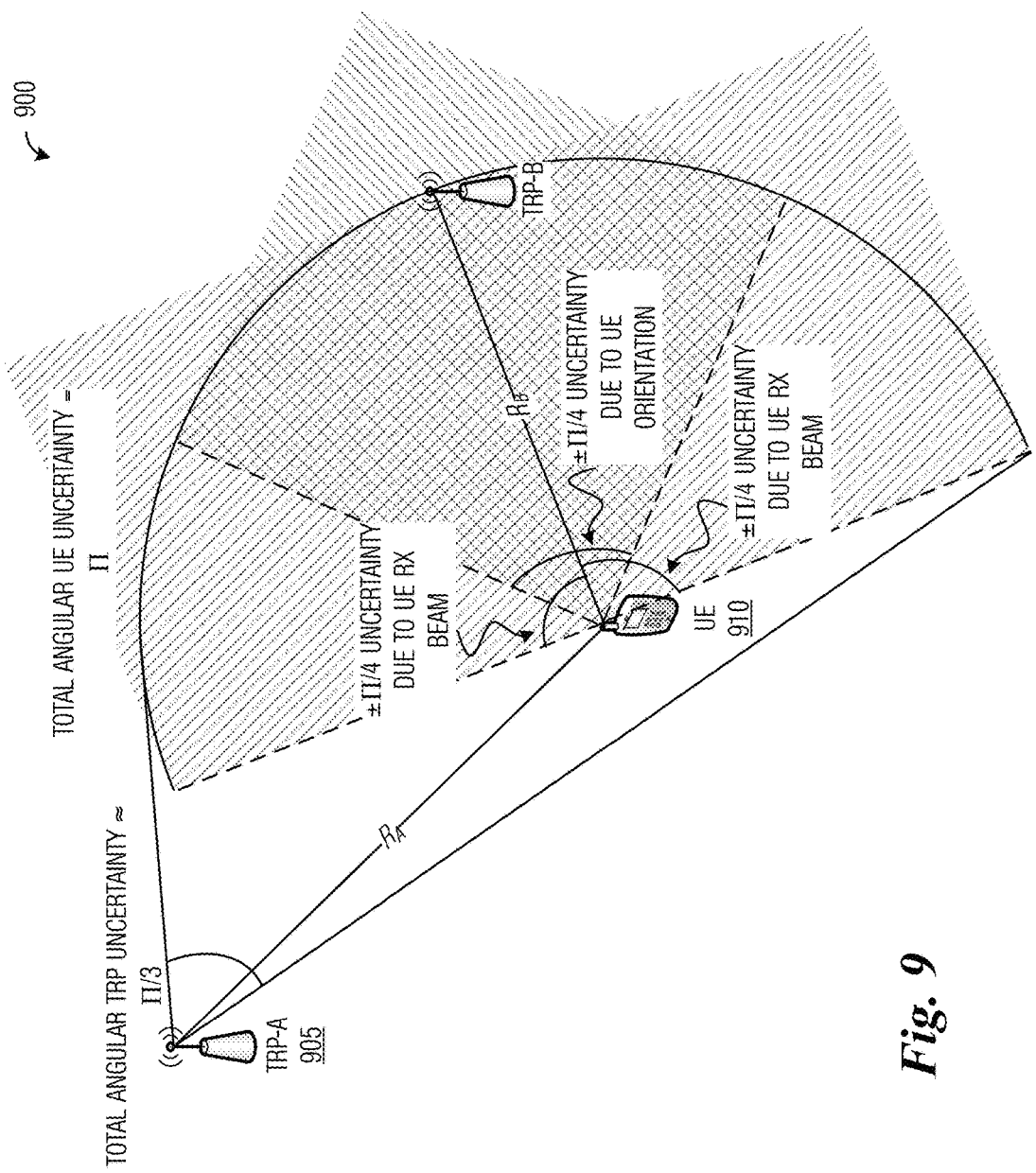
FIG. 9 illustrates a communications system highlighting the reduction in angular search space due to directional information according to embodiments presented herein.

FIG. 9 illustrates a communications system 900 highlighting the reduction in angular search space due to directional information. As shown in FIG. 9, a UE 910 has a total angular uncertainty of approximately $\pi$ ($\pm\pi/2$) radians, which arises from an uncertainty of $\pm\pi/4$ radians due to the beam width of the receive beams of UE 910 and an uncertainty of $\pm\pi/4$ radians due to the orientation of UE 910, both due to the beam width of the receive beams subtending a right angle ($\pi/2$). However, as shown in FIG. 9, the relatively large uncertainty at UE 910 of approximately $\pi$ radians results in a total angular uncertainty of approximately $\pi/3$ radians at a serving TRP 905, which is a factor of 6 reduction as compared to an exhaustive search in all directions.

When the UE receives strong signals from the neighbor TRP, the UE may also be able to receive the system information of the neighbor TRP. Therefore, the identifier, e.g., a cell identifier or a TRP identifier, of the neighbor TRP is readily available. The serving TRP can instruct the UE to report the identifier of the neighbor to the serving TRP, such as by using a mechanism similar to the 3GPP LTE mechanism for reporting the cell global identification (CGI) of the neighbor cell. Information and/or parameters not available from the neighbor TRP may be retrieved from a network server, using the identifier of the neighbor TRP as a key, for example.

Beyond the identifier of the neighbor TRP, additional information that the UE may report includes:

Downlink beam identifier;
Directional information of the downlink beam, such as the beam index;
Global information related to the downlink broadcast parameters;
Orientation of the neighbor TRP; and
Time division duplexed (TDD) configuration for the downlink and uplink beam directions (particularly useful in the neighbor list).

The additional information may be reported to the serving TRP. The downlink beam identifier and the directional information of the downlink beam can further reduce the search space associated with the search for the neighbor TRP. The downlink broadcast parameters, the TDD configuration, and the directional information may help to populate the neighbor list of the serving TRP that is delivered to other UEs. As an illustrative example, the serving TRP can transmit information (including the downlink broadcast parameters, the TDD configuration, and the directional information) about the neighbor TRP to other UEs. Such information may be provided by various signaling methods, e.g., by broadcast transmission, by dedicated transmission as part of a measurement configuration, etc. Providing the information to the other UEs may be advantageous because the other UEs will generally perform searches for neighbor TRPs relatively often, e.g., more often than for the serving TRP. Furthermore, in some cases the search for neighbor TRPs requires an interruption to communications between the UE and the serving cell, e.g., when measurement gaps are provided as part of an inter-frequency measurement configuration. In such cases, information that speeds up the search process for neighbor TRPs can reduce the amount of interruption to communications.

Figure 10:
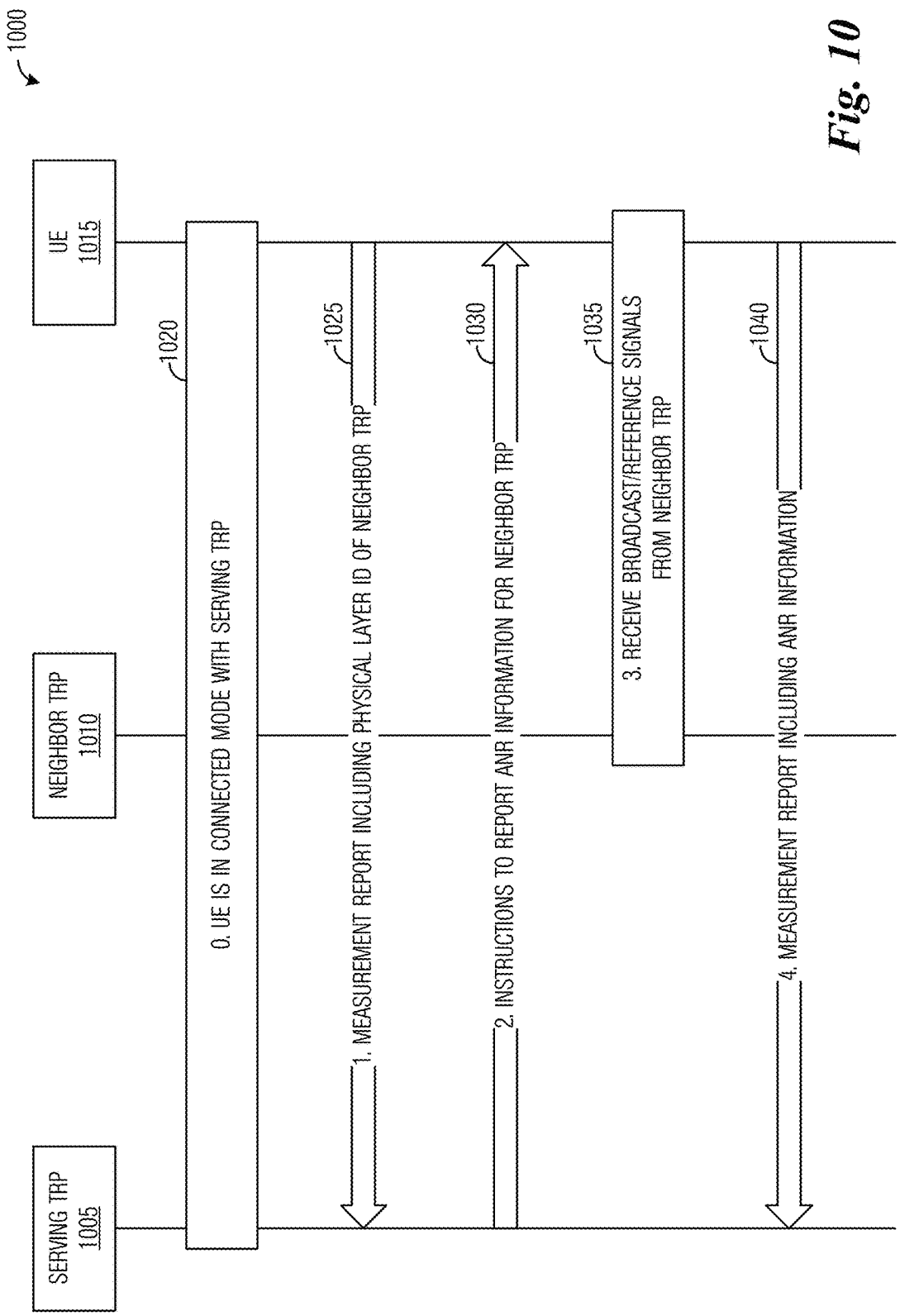
FIG. 10 illustrates an example ANR procedure wherein measurements are provided by a UE according to embodiments presented herein.

FIG. 10 illustrates an example ANR procedure 1000 wherein measurements are provided by a UE. ANR procedure 1000 involves messages exchanged and processing performed by a serving TRP 1005, a neighbor TRP 1010, and a UE 1015. ANR procedure 1000 begins with UE 1015 being in a connected mode with serving TRP 1005 (block 1020). UE 1015 is able to detect downlink transmissions from neighbor TRP 1010 and decode an identifier of neighbor TRP 1010, e.g., a physical layer identifier. UE 1015 sends a measurement report including the physical layer identifier of neighbor TRP 1010 to serving TRP 1005 (event 1025). Serving TRP 1005 sends instructions to UE 1015 to report ANR information of neighbor TRP 1010 (event 1030). UE 1015 receives broadcast and/or reference signals from neighbor TRP 1010 and makes measurements based on the received signals, as well as decode information included in the received signals (block 1035). The measurements and information include directional information, ranging information, spatial information, system information, beamforming parameters, additional information, and so on. Collectively, the measurements and information is referred to as ANR information. UE 1015 sends a measurement report including ANR information to serving TRP 1005 (event 1040).

It is noted that at a high level, ANR procedure 1000 is similar to ANR procedure 200. However, significant differences exist in the type of ANR information requested in event 1030 and reported in event 1040. Additional differences exist in how serving TRP 1005 processes and utilizes the ANR information received from UE 1015.

Figure 11:
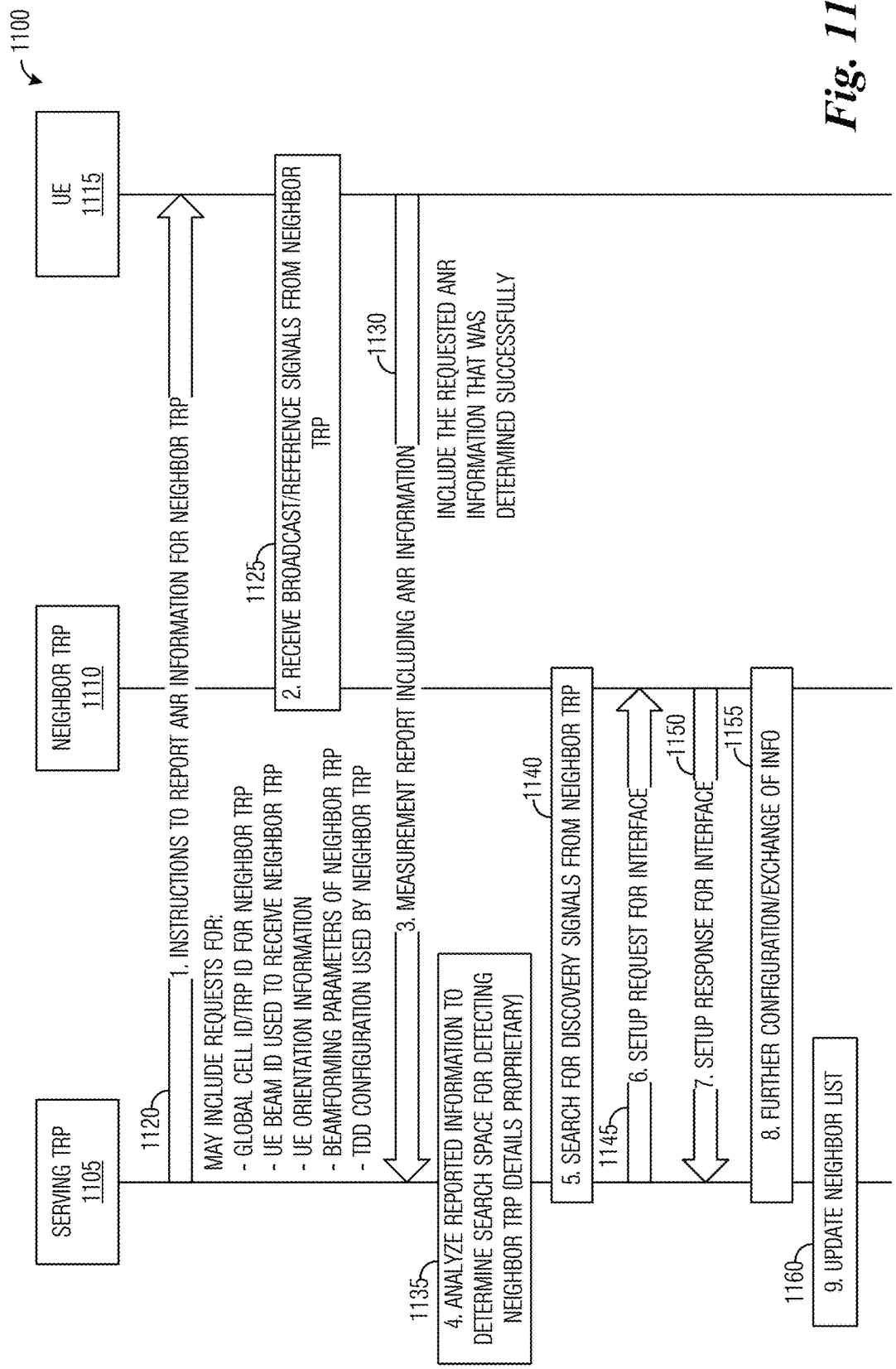
FIG. 11 illustrates an interface establishing procedure using ANR information according to embodiments presented herein.

FIG. 11 illustrates an interface establishing procedure 1100 using ANR information. Interface establishing procedure 1100 involves messages exchanged and processing performed by a serving TRP 1105, a neighbor TRP 1110, and a UE 1115. Interface establishing procedure 1100 may begin after serving TRP 1105 receives a measurement report from UE 1115 that includes a physical layer identifier of neighbor TRP 1110, such as event 1025 of FIG. 10.

Serving TRP 1105 sends instructions to UE 1115 to report ANR information of neighbor TRP 1110 (event 1120). The instructions may include requests for a CGI or TRP identifier of neighbor TRP 1110, a receive beam identifier used by UE 1115 to receive transmissions from neighbor TRP 1110, a transmit beam identifier used by neighbor TRP 1110, orientation information of UE 1115, beamforming parameters of neighbor TRP 1110, and TDD configuration used by neighbor TRP 1110. The instruction may also include requests for ranging information, system information, additional information, and so on. UE 1115 receives broadcast and/or reference signals from neighbor TRP 1110 and makes measurements based on the received signals, as well as decode information included in the received signals (block 1125). UE 1115 sends a measurement report including ANR information to serving TRP 1105 (event 1130).

Serving TRP 1105 analyzes the reported ANR information to determine a search space for detecting neighbor TRP 1110 (block 1135). Serving TRP 1105 searches for discovery signals from neighbor TRP 1110 (block 1140). For discussion purposes, it is assumed that serving TRP 1105 is able to find neighbor TRP 1110. Serving TRP 1105 sends a setup interface request to neighbor TRP 1110 (event 1145). Neighbor TRP 1110 sends a setup interface response to serving TRP 1105 (event 1150). Serving TRP 1105 and neighbor TRP 1110 further exchange information and setup the interface (block 1155). Serving TRP 1105 updates neighbor list (block 1160). Updating the neighbor list may include serving TRP 1105 adding neighbor TRP 1110 to the neighbor list, or adding a subset of the ANR information (e.g., the beamforming parameters or a portion thereof) associated with neighbor TRP 1110 to the neighbor list.

It is noted that setting up an interface with neighbor TRP 1110, or updating the neighbor list are examples of neighbor configurations for neighbor TRP 1110. A subset of the ANR information is used to assist in the search for discovery signals from neighbor TRP 1110, which, in turn, is used to setup the neighbor configurations. The subset of the ANR information may be used to limit or place a bound on the search space that serving TRP 1105 searches to search for discovery signals from neighbor TRP 1110. Updating the neighbor list may involve serving TRP 1110 adding neighbor TRP 1110 to the neighbor list, or adding a subset of the ANR information (e.g., the beamforming parameters or a portion thereof) associated with neighbor TRP 1110 to the neighbor list, as described above.

Figure 12:
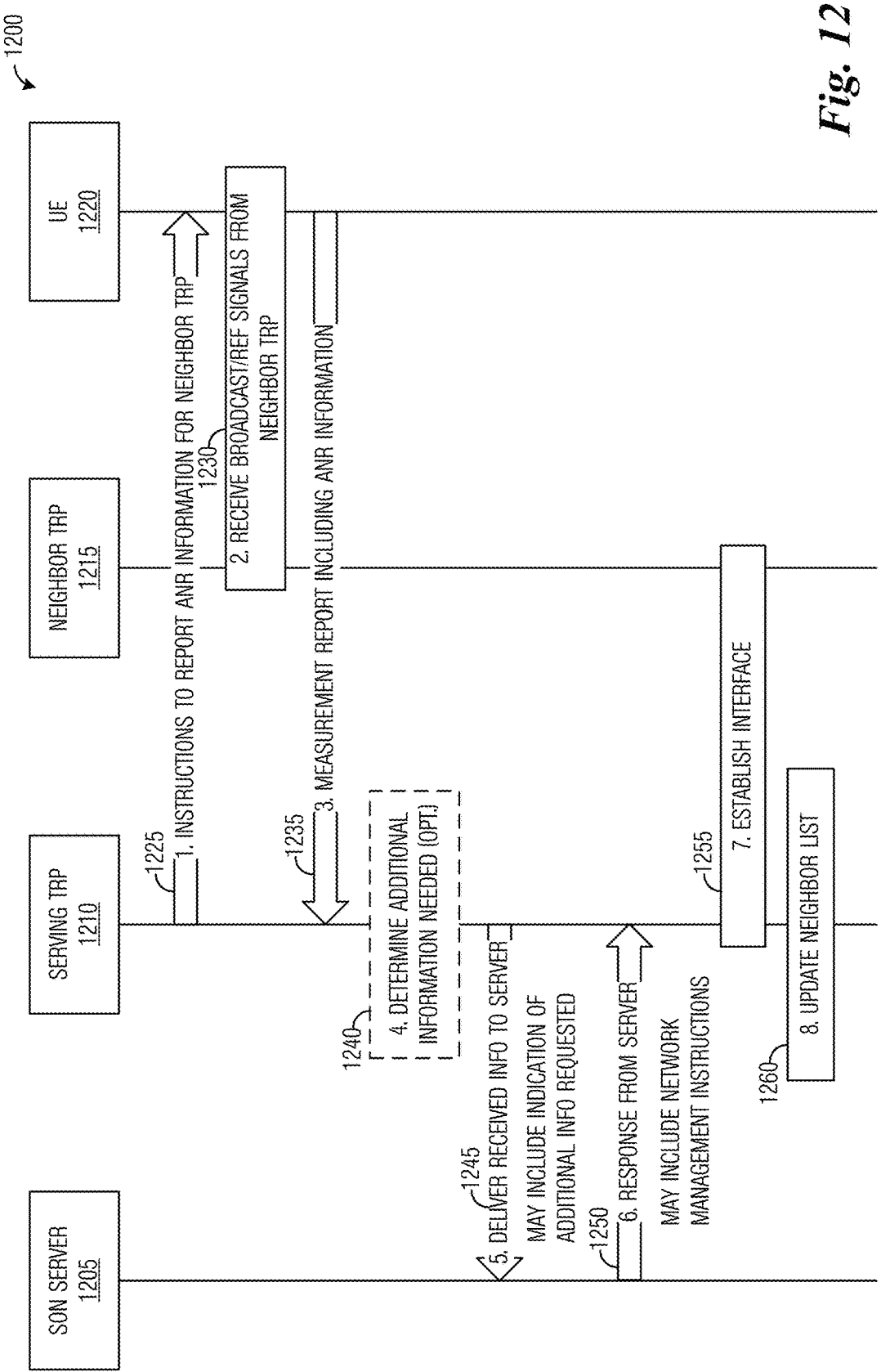
FIG. 12 illustrates an interface establishing procedure using ANR information highlighting interactions with a SON server according to embodiments presented herein.

FIG. 12 illustrates a neighbor discovery procedure 1200, potentially resulting in an interface establishing procedure and/or a neighbor list updating procedure, using ANR information highlighting interactions with a server in the network, e.g. a SON server. Neighbor discovery procedure 1200 involves messages exchanged and processing performed by a SON server 1205, a serving TRP 1210, a neighbor TRP 1215, and a UE 1220. Neighbor discovery procedure 1200 may begin after serving TRP 1210 receives a measurement report from UE 1220 that includes a physical layer identifier of neighbor TRP 1215, such as event 1025 of FIG. 10.

Serving TRP 1210 sends instructions to UE 1220 to report ANR information of neighbor TRP 1215 (event 1225). The instructions may include requests for a CGI or TRP identifier of neighbor TRP 1215, a receive beam identifier used by UE 1220 to receive transmissions from neighbor TRP 1215, orientation information of UE 1220, a transmit beam identifier used by neighbor TRP 1215, beamforming parameters of neighbor TRP 1215, and TDD configuration used by neighbor TRP 1215. The instruction may also include requests for ranging information, system information, additional information, and so on. UE 1220 receives broadcast and/or reference signals from neighbor TRP 1215 and makes measurements based on the received signals, as well as decode information included in the received signals (block 1230). UE 1220 sends a measurement report including ANR information to serving TRP 1210 (event 1235).

Serving TRP 1210 may determine additional information (block 1240) that it considers necessary for anticipated network management operations, e.g., updating its neighbor list or establishing an interface with neighbor TRP 1215. For example, if a piece of information requested in event 1225 was not included in the report at event 1235, serving TRP 1210 may consider that the missing piece of information needs to be determined from another source. Other needed information could include configurations known only to network nodes and not available for UE 1220 to report, such as transport configuration or security information relating to the interface to be established with neighbor TRP 1215, mobility parameters to be used between serving TRP 1210 and neighbor TRP 1215, and so on. Serving TRP 1210 sends the received ANR information to SON server 1205 (event 1245). Serving TRP 1210 may also include a request for the additional information. SON server 1205 sends a response to serving TRP 1210 (event 1250). The response may include network management instructions, such as a command to establish an interface and/or a command to add neighbor TRP 1215 to the neighbor list of serving TRP 1210. Serving TRP 1210 and neighbor TRP 1215 may exchange information and setup the interface (block 1255). Serving TRP 1210 may add neighbor TRP 1215 to neighbor list (block 1260). The operations at blocks 1255 and 1260 may be conditional upon receipt of network management instructions in event 1250; alternatively, they may be triggered by an autonomous decision by serving TRP 1210.

Figures 13, 14:
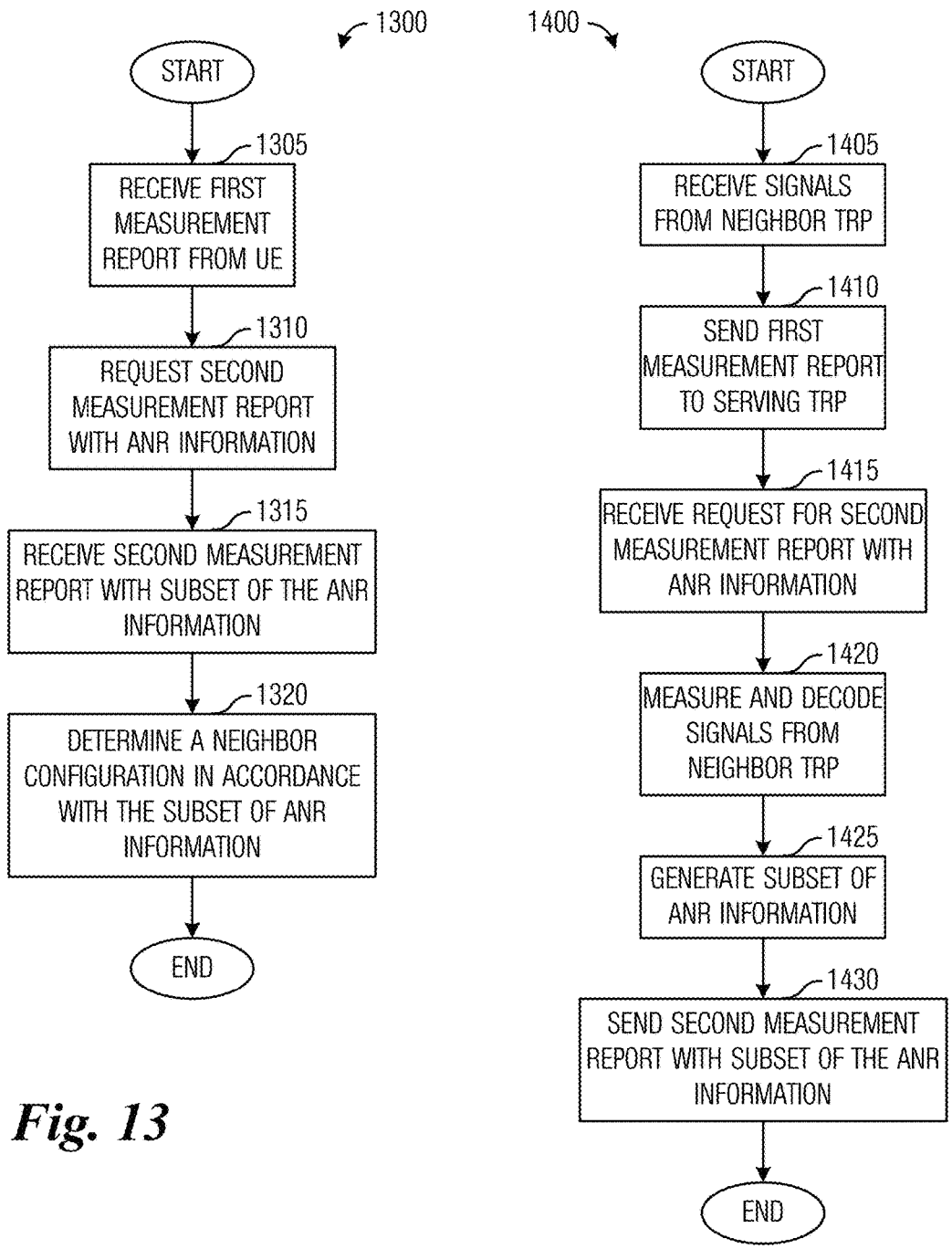
FIG. 13 illustrates a flow diagram of example operations occurring in a serving TRP determining a neighbor configuration based on ANR information according to embodiments presented herein.
FIG. 14 illustrates a flow diagram of example operations occurring in a UE providing ANR information according to embodiments presented herein.

FIG. 13 illustrates a flow diagram of example operations 1300 occurring in a serving TRP determining a neighbor configuration based on ANR information. Operations 1300 may be indicative of operations occurring in a serving TRP as the serving TRP determines a neighbor configuration for a neighbor TRP in accordance with ANR information.

Operations 1300 begin with the serving TRP receiving a first measurement report from a UE (block 1305). The measurement report includes an identifier of the neighbor TRP. The identifier may be a physical layer identifier of the neighbor TRP. The serving TRP requests a second measurement report from the UE, the measurement report including ANR information (block 1310). The ANR information requested may include a CGI or TRP identifier of the neighbor TRP, a receive beam identifier used by the UE to receive transmissions from the neighbor TRP, a transmit beam identifier used by TRP 1110, orientation information of the UE, beamforming parameters of the neighbor TRP, and TDD configuration used by the neighbor TRP, as well as ranging information, system information, additional information, and so on. The serving UE receives the second measurement report that includes a subset of the ANR information (block 1315). The serving UE determines a neighbor configuration in accordance with the subset of the ANR information (block 1320). Determining the neighbor configuration may include setting up an interface with the neighbor TRP and/or updating a neighbor list to include at least some of the ANR information about the neighbor TRP. The serving TRP may use at least some of the ANR information about the neighbor TRP to help reduce the search space that is searched by the serving TRP in order to search for discovery signals from the neighbor TRP.

FIG. 14 illustrates a flow diagram of example operations 1300 occurring in a UE providing ANR information. Operations 1400 may be indicative of operations occurring in a UE as the UE provides ANR information.

Operations 1400 begin with the UE receiving signals from a neighbor TRP (block 1405). The signals may be data transmissions, control signaling, and/or reference signals transmitted by the neighbor TRP. The UE sends a first measurement report to a serving TRP (block 1410). The first measurement report includes at least an identifier of the neighbor TRP. The UE receives a request from the serving TRP to provide a second measurement report including ANR information about the neighbor TRP (block 1415). The UE measures and decodes signals from the neighbor TRP (block 1420). The measured and decoded signals are used by the UE to generate a subset of the ANR information requested by the serving TRP (block 1425). The UE may also generate ranging information, system information, additional information, and so on, for the neighbor TRP. The UE sends the second measurement report to the serving TRP, the second measurement report includes the subset of the ANR information (block 1430).

In a first aspect, the present application provides a method for operating a first TRP. The method includes receiving, by the first TRP, a first measurement report from a UE, the first measurement report including an identifier of a second TRP, requesting, by the first TRP, a second measurement report from the UE, the second measurement report to include ANR information associated with the second TRP, wherein the ANR information includes a beam specific information, receiving, by the first TRP, the second measurement report including a first subset of the ANR information, and determining, by the first TRP, a neighbor configuration with the second TRP in accordance with the first subset of the ANR information.

According to a first embodiment of the method according to the first aspect, the beam specific information includes at least one of a receive beam identifier used by the UE to receive transmissions from the second TRP, a transmit beam identifier used by the second TRP, orientation information of the UE, or beamforming parameters of the second TRP. According to a second embodiment of the method according to any preceding embodiment of the first aspect or the first aspect as such, the ANR information comprises at least one of a TRP identifier of the second TRP, time division duplexed (TDD) configuration of the second TRP, ranging information, or system information. According to a third embodiment of the method according to any preceding embodiment of the first aspect or the first aspect as such, determining the neighbor configuration includes adding, by the first TRP, a second subset of the ANR information to an entry associated with the second TRP from a neighbor list. According to a fourth embodiment of the method according to any preceding embodiment of the first aspect or the first aspect as such, determining the neighbor configuration includes generating, by the first TRP, an entry associated with the second TRP for a neighbor list, the entry including a third subset of the ANR information.

According to a fifth embodiment of the method according to any preceding embodiment of the first aspect or the first aspect as such, determining the neighbor configuration comprises establishing, by the first TRP, a wireless link with the second TRP. According to a sixth embodiment of the method according to any preceding embodiment of the first aspect or the first aspect as such, the first subset of the ANR information includes beamforming parameters of the second TRP, and determining the neighbor configuration includes imposing, by the first TRP, a bound on a search space used to search for the second TRP, and establishing, by the first TRP, the wireless link with the second TRP when the second TRP is discovered.

According to a seventh embodiment of the method according to any preceding embodiment of the first aspect or the first aspect as such, the method further includes delivering, by the first TRP, a fourth subset of the ANR information to a network configuration server. According to an eighth embodiment of the method according to any preceding embodiment of the first aspect or the first aspect as such, the method further includes receiving, by the first TRP, an instruction for managing the neighbor configuration. According to a ninth embodiment of the method according to any preceding embodiment of the first aspect or the first aspect as such, the instruction specifies an addition of a fifth subset of the ANR information to an entry associated with the second TRP in a neighbor list. According to a tenth embodiment of the method according to any preceding embodiment of the first aspect or the first aspect as such, the instruction specifies a generation of an entry associated with the second TRP in a neighbor list, the entry including a sixth subset of the ANR information. According to an eleventh embodiment of the method according to any preceding embodiment of the first aspect or the first aspect as such, the instruction specifies an establishment of a wireless link with the second TRP.

In a second aspect, the present application provides a method for operating a UE. The method includes sending, by the UE, a first measurement report to a first TRP, the first measurement report including an identifier of a second TRP determined in accordance with first signals received from the second TRP, receiving, by the UE, a request for a second measurement report, the second measurement report to include ANR information associated with the second TRP, wherein the ANR information includes a beam specific information, generating, by the UE, a subset of the ANR information in accordance with second signals received from the second TRP, and sending, by the UE, the second measurement report to the first TRP, the second measurement report including the subset of the ANR information.

According to a first embodiment of the method according to the second aspect, the beam specific information comprises at least one of a receive beam identifier used by the UE to receive transmissions from the second TRP, a transmit beam identifier used by the second TRP, orientation information of the UE, or beamforming parameters of the second TRP. According to a second embodiment of the method according to any preceding embodiment of the second aspect or the second aspect as such, the ANR information comprises at least one of a TRP identifier of the second TRP, TDD configuration of the second TRP, ranging information, or system information. According to a third embodiment of the method according to any preceding embodiment of the second aspect or the second aspect as such, generating the subset of the ANR information includes generating, by the UE, the subset of the ANR information in accordance with the second signals and a configuration of a receive beam used to receive the second signals. According to a fourth embodiment of the method according to any preceding embodiment of the second aspect or the second aspect as such, the identifier of the second TRP comprises a physical layer identifier.

In a third aspect, the present application provides a first TRP is provided. The first TRP includes one or more processors, and a computer readable storage medium storing programming for execution by the one or more processors. The programming including instructions to configure the first TRP to receive a first measurement report from a UE, the first measurement report including an identifier of a second TRP, request a second measurement report to include ANR information associated with the second TRP, wherein the ANR information includes a beam specific information, receive the second measurement report including a first subset of the ANR information, and determine a neighbor configuration with the second TRP in accordance with the first subset of the ANR information.

According to a first embodiment of the first TRP according to the third aspect, the programming includes instructions to configure the first TRP to one of add a second subset of the ANR information to an entry associated with the second TRP from a neighbor list, generate an entry associated with the second TRP for the neighbor list, the entry including a third subset of the ANR information, or establish a wireless link with the second TRP. According to a second embodiment of the first TRP according to any preceding embodiment of the third aspect or the third aspect as such, the programming includes instructions to configure the first TRP to deliver a fourth subset of the ANR information to a network configuration server.

In a fourth aspect, the present application provides a UE. The UE includes one or more processors, and a computer readable storage medium storing programming for execution by the one or more processors. The programming including instructions to configure the UE to send a first measurement report to a first TRP, the first measurement report including an identifier of a second TRP determined in accordance with first signals received from the second TRP, receive a request for a second measurement report, the second measurement report to include ANR information associated with the second TRP, wherein the ANR information includes a beam specific information, generate a subset of the ANR information in accordance with second signals received from the second TRP, and send the second measurement report to the first TRP, the second measurement report including the subset of the ANR information.

According to a first embodiment of the UE according to the fourth aspect, the programming includes instructions to configure the UE to generate the subset of the ANR information in accordance with the second signals and a configuration of a receive beam used to receive the second signals.

Figure 15:
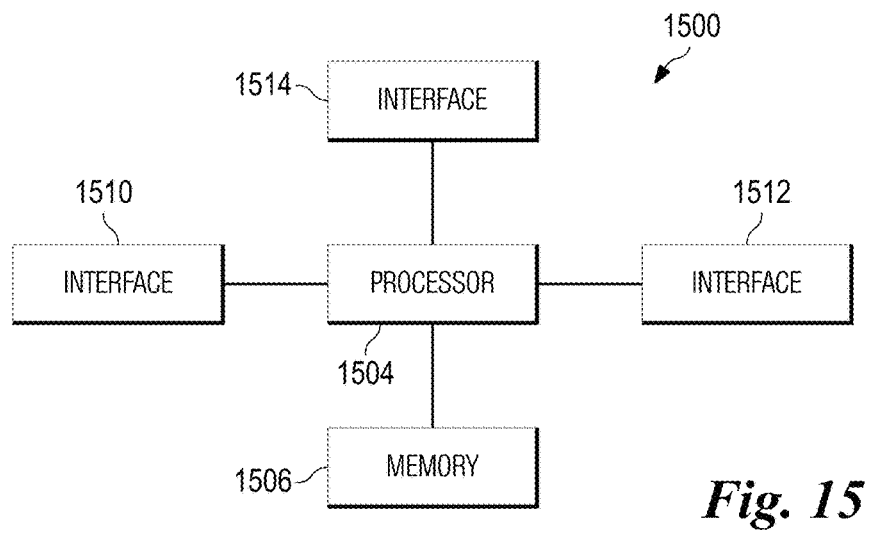
FIG. 15 illustrates a block diagram of an embodiment processing system for performing embodiments described herein.

FIG. 15 illustrates a block diagram of an embodiment processing system 1500 for performing methods described herein, which may be installed in a host device. As shown, the processing system 1500 includes a processor 1504, a memory 1506, and interfaces 1510-1514, which may (or may not) be arranged as shown in FIG. 15. The processor 1504 may be any component or collection of components adapted to perform computations and/or other processing related tasks, and the memory 1506 may be any component or collection of components adapted to store programming and/or instructions for execution by the processor 1504. In an embodiment, the memory 1506 includes a non-transitory computer readable medium. The interfaces 1510, 1512, 1514 may be any component or collection of components that allow the processing system 1500 to communicate with other devices/components and/or a user. For example, one or more of the interfaces 1510, 1512, 1514 may be adapted to communicate data, control, or management messages from the processor 1504 to applications installed on the host device and/or a remote device. As another example, one or more of the interfaces 1510, 1512, 1514 may be adapted to allow a user or user device (e.g., personal computer (PC), etc.) to interact/communicate with the processing system 1500. The processing system 1500 may include additional components not depicted in FIG. 15, such as long term storage (e.g., non-volatile memory, etc.).

In some embodiments, the processing system 1500 is included in a network device that is accessing, or part otherwise of, a telecommunications network. In one example, the processing system 1500 is in a network-side device in a wireless or wireline telecommunications network, such as a base station, a relay station, a scheduler, a controller, a gateway, a router, an applications server, or any other device in the telecommunications network. In other embodiments, the processing system 1500 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 16:
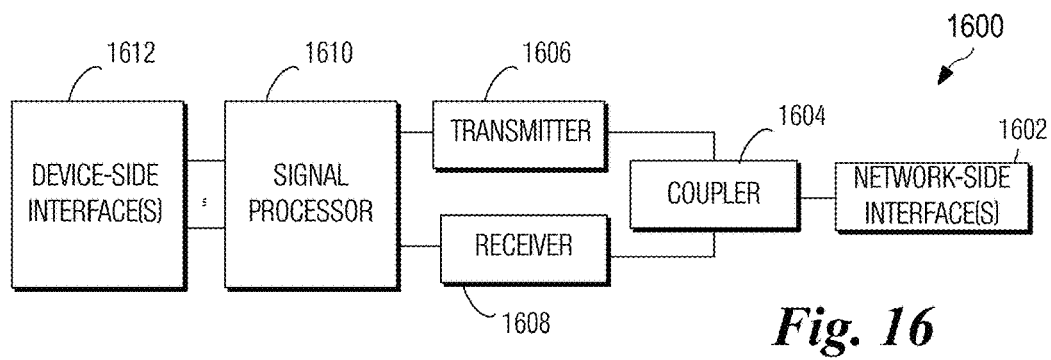
FIG. 16 illustrates a block diagram of a transceiver adapted to transmit and receive signaling over a telecommunications network according to embodiments presented herein.

In some embodiments, one or more of the interfaces 1510, 1512, 1514 connects the processing system 1500 to a transceiver adapted to transmit and receive signaling over the telecommunications network. FIG. 16 illustrates a block diagram of a transceiver 1600 adapted to transmit and receive signaling over a telecommunications network. The transceiver 1600 may be installed in a host device. As shown, the transceiver 1600 comprises a network-side interface 1602, a coupler 1604, a transmitter 1606, a receiver 1608, a signal processor 1610, and a device-side interface 1612. The network-side interface 1602 may include any component or collection of components adapted to transmit or receive signaling over a wireless or wireline telecommunications network. The coupler 1604 may include any component or collection of components adapted to facilitate bi-directional communication over the network-side interface 1602. The transmitter 1606 may include any component or collection of components (e.g., up-converter, power amplifier, etc.) adapted to convert a baseband signal into a modulated carrier signal suitable for transmission over the network-side interface 1602. The receiver 1608 may include any component or collection of components (e.g., down-converter, low noise amplifier, etc.) adapted to convert a carrier signal received over the network-side interface 1602 into a baseband signal. The signal processor 1610 may include any component or collection of components adapted to convert a baseband signal into a data signal suitable for communication over the device-side interface(s) 1612, or vice-versa. The device-side interface(s) 1612 may include any component or collection of components adapted to communicate data-signals between the signal processor 1610 and components within the host device (e.g., the processing system 1500, local area network (LAN) ports, etc.).

The transceiver 1600 may transmit and receive signaling over any type of communications medium. In some embodiments, the transceiver 1600 transmits and receives signaling over a wireless medium. For example, the transceiver 1600 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1602 comprises one or more antenna/radiating elements. For example, the network-side interface 1602 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1600 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a requesting unit/module, a determining unit/module, an adding unit/module, a generating unit/module, an establishing unit/module, an imposing unit/module, and/ or a delivering unit/module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although the present disclosure and its advantages have been described in detail, it should be understood that various changes, substitutions and alterations can be made herein without departing from the spirit and scope of the disclosure as defined by the appended claims.

What is claimed is:

1. A method for operating a first transmit-receive point (TRP), the method comprising:
   receiving, by the first TRP, a first measurement report from a user equipment (UE), the first measurement report including an identifier of a second TRP, the second TRP being absent from a neighbor list configuration of the first TRP;
   requesting, by the first TRP, a second measurement report from the UE, the second measurement report to include automatic neighbor relation (ANR) information associated with the second TRP, the ANR information including beam specific information;
   receiving, by the first TRP from the UE, the second measurement report including a first subset of the ANR information, the first subset of the ANR information comprising at least one of a receive beam identifier used by the UE to receive transmissions from the second TRP, orientation information of the UE, or beamforming parameters of the second TRP; and
   determining, by the first TRP, a neighbor configuration with the second TRP in accordance with the first subset of the ANR information.

2. The method of claim 1, wherein the first subset of the ANR information further comprises a transmit beam identifier used by the second TRP.

3. The method of claim 1, wherein the ANR information comprises at least one of a TRP identifier of the second TRP, time division duplexed (TDD) configuration of the second TRP, ranging information, or system information.

4. The method of claim 1, wherein determining the neighbor configuration comprises generating, by the first TRP, an entry associated with the second TRP for the neighbor list configuration, the entry including a third subset of the ANR information.

5. The method of claim 1, wherein determining the neighbor configuration comprises establishing, by the first TRP, a wireless link with the second TRP.

6. The method of claim 5, wherein the first subset of the ANR information comprises beamforming parameters of the second TRP, and wherein determining the neighbor configuration comprises:
   imposing, by the first TRP, a bound on a search space used to search for the second TRP; and
   establishing, by the first TRP, the wireless link with the second TRP when the second TRP is discovered.

7. The method of claim 1, further comprising delivering, by the first TRP, a fourth subset of the ANR information to a network configuration server.

8. The method of claim 7, further comprising receiving, by the first TRP, an instruction for managing the neighbor configuration.

9. The method of claim 8, wherein the instruction specifies a generation of an entry associated with the second TRP in the neighbor list configuration, the entry including a sixth subset of the ANR information.

10. The method of claim 8, wherein the instruction specifies an establishment of a wireless link with the second TRP.

11. A method for operating a user equipment (UE), the method comprising:
    sending, by the UE, a first measurement report to a first transmit-receive point (TRP), the first measurement report including an identifier of a second TRP determined in accordance with first signals received from the second TRP, the second TRP being absent from a neighbor list configuration of the first TRP;
    receiving, by the UE, a request for a second measurement report, the second measurement report to include automatic neighbor relation (ANR) information associated with the second TRP, the ANR information including beam specific information;
    generating, by the UE, a subset of the ANR information in accordance with second signals received from the second TRP, the subset of the ANR information comprising at least one of a receive beam identifier used by the UE to receive transmissions from the second TRP, orientation information of the UE, or beamforming parameters of the second TRP; and
    sending, by the UE, the second measurement report to the first TRP, the second measurement report including the subset of the ANR information.

12. The method of claim 11, wherein the subset of the ANR information further comprises a transmit beam identifier used by the second TRP.

13. The method of claim 11, wherein the ANR information comprises at least one of a TRP identifier of the second TRP, time division duplexed (TDD) configuration of the second TRP, ranging information, or system information.

14. The method of claim 11, wherein generating the subset of the ANR information comprises generating, by the UE, the subset of the ANR information in accordance with the second signals and a configuration of a receive beam used to receive the second signals.

15. The method of claim 11, wherein the identifier of the second TRP comprises a physical layer identifier.

16. A first transmit-receive point (TRP) comprising:
    a non-transitory memory storage comprising instructions; and
    one or more processors in communication with the non-transitory memory storage,
    wherein the one or more processors execute the instructions to:
       receive a first measurement report from a user equipment (UE), the first measurement report including an identifier of a second TRP, the second TRP being absent from a neighbor list configuration of the first TRP,
       request a second measurement report to include automatic neighbor relation (ANR) information associated with the second TRP, wherein the ANR information includes beam specific information,
       receive, from the UE, the second measurement report including a first subset of the ANR information, wherein the first subset of the ANR information comprises at least one of a receive beam identifier used by the UE to receive transmissions from the second TRP, orientation information of the UE, or beamforming parameters of the second TRP, and determine a neighbor configuration with the second TRP in accordance with the first subset of the ANR information.

17. The first TRP of claim 16, wherein the one or more processors execute the instructions to one of generate an entry associated with the second TRP for the neighbor list configuration, the entry including a third subset of the ANR information, or establish a wireless link with the second TRP.

18. The first TRP of claim 16, wherein the one or more processors execute the instructions to deliver a fourth subset of the ANR information to a network configuration server.

19. A user equipment (UE) comprising:
a non-transitory memory storage comprising instructions; and
one or more processors in communication with the non-transitory memory storage,
wherein the one or more processors execute the instructions to:
send a first measurement report to a first transmit-receive point (TRP), the first measurement report including an identifier of a second TRP determined in accordance with first signals received from the second TRP, the second TRP being absent from a neighbor list configuration of the first TRP,
receive a request for a second measurement report, the second measurement report to include automatic neighbor relation (ANR) information associated with the second TRP,
wherein the ANR information includes beam specific information,
generate a subset of the ANR information in accordance with second signals received from the second TRP, wherein first subset of the ANR information comprises at least one of a receive beam identifier used by the UE to receive transmissions from the second TRP, orientation information of the UE, or beamforming parameters of the second TRP, and
send the second measurement report to the first TRP, the second measurement report including the subset of the ANR information.

20. The UE of claim 19, wherein the one or more processors execute the instructions to generate the subset of the ANR information in accordance with the second signals and a configuration of a receive beam used to receive the second signals.

* * * * *